US010575350B2

(12) United States Patent
Emami et al.

(10) Patent No.: US 10,575,350 B2
(45) Date of Patent: *Feb. 25, 2020

(54) EMBEDDING LOW-SPEED COMMUNICATIONS IN A HIGH SPEED WIRELESS TUNNELING SYSTEM

(71) Applicant: Ubistar Technology, Inc., Cupertino, CA (US)

(72) Inventors: Sohrab Emami, San Francisco, CA (US); Brian Henry John, San Jose, CA (US); Jean-Marc Laurent, San Jose, CA (US); Nishit Kumar, San Jose, CA (US); Wen Tang, Santa Clara, CA (US); Hai Zhu, San Jose, CA (US)

(73) Assignee: Ubistar Technology, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/867,582

(22) Filed: Jan. 10, 2018

(65) Prior Publication Data

US 2018/0139793 A1    May 17, 2018

Related U.S. Application Data

(63) Continuation of application No. 15/072,822, filed on Mar. 17, 2016, now Pat. No. 9,883,539.
(Continued)

(51) Int. Cl.
*H04W 76/12* (2018.01)
*G06F 1/3234* (2019.01)
(Continued)

(52) U.S. Cl.
CPC .............. *H04W 76/12* (2018.02); *G06F 1/26* (2013.01); *G06F 1/3278* (2013.01);
(Continued)

(58) Field of Classification Search
CPC ........ H04W 76/12; G06F 1/26; G06F 1/3278; H04L 12/4633
See application file for complete search history.

(56) References Cited

U.S. PATENT DOCUMENTS 7,487,426 B2    2/2009  Hoyer
7,639,687 B1   12/2009  Tsai et al.
(Continued)

FOREIGN PATENT DOCUMENTS

JP   2005044094 A    2/2005
JP   2014192572 A   10/2014
(Continued)

OTHER PUBLICATIONS

United States Office Action, U.S. Appl. No. 15/073,348, dated Feb. 7, 2018, 12 pages.
(Continued)

*Primary Examiner* — Siming Liu
(74) *Attorney, Agent, or Firm* — Rimon PC

(57) ABSTRACT

A disclosed wireless tunneling system tunnels communications between two processing apparatuses through a wireless link, while maintaining compliance of the communications between the two processing apparatuses with at least two different wired communication protocols. In one embodiment, the wireless tunneling system includes two wireless tunneling apparatuses that communicate with each other through the wireless link. A local wireless tunneling apparatus is coupled to a local processing apparatus through a wired connection and a remote wireless tunneling apparatus is coupled to the remote processing apparatus through another wired connection. The two processing apparatuses may communicate with each other through the wireless link
(Continued)

using the two wireless tunneling apparatuses as if the two processing apparatuses were connected through wired connections.

20 Claims, 12 Drawing Sheets

Related U.S. Application Data

(60) Provisional application No. 62/135,007, filed on Mar. 18, 2015.

(51) Int. Cl.
| | |
|---|---|
| *G06F 1/26* | (2006.01) |
| *H04L 12/46* | (2006.01) |
| *H04L 12/24* | (2006.01) |
| *H04W 40/10* | (2009.01) |

(52) U.S. Cl.
CPC ...... *H04L 12/4633* (2013.01); *H04L 41/0873* (2013.01); *H04W 40/10* (2013.01); *Y02B 70/30* (2013.01); *Y02D 10/157* (2018.01); *Y02D 70/00* (2018.01); *Y02D 70/326* (2018.01)

(56) References Cited

U.S. PATENT DOCUMENTS

| | | | |
|---|---|---|---|
| 7,978,099 | B2 | 7/2011 | Lee et al. |
| 9,635,680 | B2* | 4/2017 | Odlyzko ........... H04W 72/1215 |
| 9,883,539 | B2* | 1/2018 | Emami ..................... G06F 1/26 |
| 2003/0052778 | A1* | 3/2003 | Wong .................. G06Q 10/087 340/540 |
| 2005/0027889 | A1 | 2/2005 | Sandulescu |
| 2005/0138229 | A1 | 6/2005 | Sartore |
| 2008/0205417 | A1 | 8/2008 | Li |
| 2008/0215773 | A1 | 9/2008 | Christison et al. |
| 2009/0190595 | A1 | 7/2009 | Jiang et al. |
| 2010/0141894 | A1 | 6/2010 | Sahraie |
| 2010/0169523 | A1 | 7/2010 | Dunstan et al. |
| 2011/0065448 | A1 | 3/2011 | Song et al. |
| 2011/0087903 | A1 | 4/2011 | MacDougall et al. |
| 2011/0205444 | A1 | 8/2011 | Yamamoto et al. |
| 2011/0317595 | A1 | 12/2011 | Kanda et al. |
| 2012/0307842 | A1 | 12/2012 | Petrov et al. |
| 2013/0007324 | A1 | 1/2013 | Moore et al. |
| 2013/0010849 | A1 | 1/2013 | Shimizu et al. |
| 2013/0051440 | A1 | 2/2013 | Rofougaran |
| 2013/0124762 | A1 | 5/2013 | Tamir et al. |
| 2013/0235886 | A1 | 9/2013 | Wang |
| 2013/0287077 | A1 | 10/2013 | Fernando et al. |
| 2014/0040486 | A1 | 2/2014 | Christie |
| 2014/0122752 | A1 | 5/2014 | Toivanen et al. |
| 2014/0136921 | A1 | 5/2014 | Murakami |
| 2014/0161174 | A1 | 6/2014 | Mohsenian |
| 2014/0219191 | A1 | 8/2014 | Stephens et al. |
| 2015/0230263 | A1 | 8/2015 | Roy et al. |
| 2016/0190996 | A1 | 6/2016 | Searle |
| 2016/0198410 | A1* | 7/2016 | Cherniavsky ..... H04W 52/0229 370/278 |
| 2016/0216757 | A1 | 7/2016 | Kim et al. |
| 2016/0278013 | A1 | 9/2016 | Shellhammer et al. |
| 2016/0334837 | A1 | 11/2016 | Dees et al. |
| 2017/0111866 | A1 | 4/2017 | Park et al. |
| 2017/0141894 | A1 | 5/2017 | Wei et al. |
| 2017/0208494 | A1 | 7/2017 | Moon et al. |
| 2017/0346539 | A1 | 11/2017 | Islam et al. |

FOREIGN PATENT DOCUMENTS

| | | |
|---|---|---|
| JP | 2015037275 A | 2/2015 |
| WO | 2010090732 A | 8/2010 |
| WO | WO 2010/090732 A1 | 8/2010 |

OTHER PUBLICATIONS

Japan Patent Office, Office Action for Japanese Application No. JP2017-548924 dated Jun. 25, 2019.
PCT International Search Report and Written Opinion, PCT Application No. PCT/US2016/023220, dated Jun. 28, 2016, 16 pages.
PCT International Search Report and Written Opinion, PCT Application No. PCT/US2016/023199, dated Jul. 8, 2016, 11 pages.
Walker, R.C. et al., "64b/66b Low-Overhead Coding Proposal for Serial Links," IEEE 802.3 High Speed Study Group, Jan. 12, 2000, 17 pages.
PCT International Search Report and Written Opinion, PCT Application No. PCT/US2015/044343, dated Dec. 3, 2015, 10 pages.

* cited by examiner

EMBEDDING LOW-SPEED COMMUNICATIONS IN A HIGH SPEED WIRELESS TUNNELING SYSTEM

CROSS-REFERENCE TO RELATED APPLICATION

This application is a continuation of U.S. application Ser. No. 15/072,822, entitled "Embedding Low-Speed Communications in a High Speed Wireless Tunneling System" filed Mar. 17, 2016, which claims the benefit of U.S. Provisional Patent Application No. 62/135,007, entitled "Wireless Tunneling System" filed on Mar. 18, 2015, both of which by incorporated by reference herein in their entirety.

BACKGROUND

1. Field of the Disclosure

Embodiments of the present disclosure generally relate to the field of wireless communication and, more particularly, to tunneling multiple communication protocols multiplexed within a single high-speed wireless communication link.

2. Description of the Related Art

In a wireless tunneling system, data that is traditionally communicated over a wired communication link is instead tunneled through a wireless channel. Conventionally, wireless communications are substantially slower than communications over wired links. Accordingly, conventional wireless systems are incapable of tunneling high speed protocol, for example, Universal Serial Bus (USB), High-Definition Media Interface (HDMI), and DisplayPort (DP) having multi-Gigabit data rates. Moreover, conventional wireless tunneling systems are unable to tunnel multiple protocols through a single wireless communication link.

SUMMARY

A disclosed wireless tunneling system tunnels communications between two processing apparatuses through a wireless link, while maintaining compliance of the communications between the two processing apparatuses with at least two different wired communication protocols.

In one embodiment, the wireless tunneling system includes two wireless tunneling apparatuses that communicate with each other through the wireless link. A local wireless tunneling apparatus is coupled to a local processing apparatus through a wired connection and a remote wireless tunneling apparatus is coupled to the remote processing apparatus through another wired connection. The two processing apparatuses may communicate with each other through the low-latency wireless link using the two wireless tunneling apparatuses as if the two processing apparatuses were connected through wired connections.

In one embodiment, the local wireless tunneling apparatus includes a wireless receiver, a state machine, an interface circuit, and a register. The wireless receiver is configured to receive a wireless receive signal from the remote wireless tunneling apparatus, the wireless receive signal having a plurality of frames, each of the plurality of frames comprising a first receive portion encoding communications corresponding to the high-speed wired communication protocol and a second receive portion encoding communications corresponding to a low-speed wired communication protocol comprising a different protocol and communicating data at a speed lower than the high-speed wired communication protocol. The wireless receiver is further configured to decode the wireless receive signal to (i) generate a first output signal based on a predicted state of the remote processing apparatus and the first receive portion that conforms to the high-speed wired communication protocol, and (ii) generate a second output signal based on the second receive portion that conforms to the low-speed wired communication protocol. The state machine is configured to determine the predicted state of the remote processing apparatus based on the first receive portion of the wireless receive signal and to control operation of the wireless receiver based on the predicted state. The interface circuit is coupled to the local processing apparatus and configured to provide the first output signal to the local processing apparatus via the high-speed wired communication protocol. The register is configured to store the second output signal.

In one embodiment, a data rate of the high-speed wired communication protocol is over Gigabits per second, and a data rate of the low-speed wired communication protocol is less than Megabits per second.

In one embodiment, the first receive portion is generated at the remote processing apparatus at a high-speed data rate based on a remote high-speed clock signal. The first output signal may be generated at the local wireless tunneling apparatus at the high-speed data rate based on a local high-speed clock signal. A low-speed data input corresponding to the second receive portion may be generated at a remote processing apparatus coupled to the remote wireless tunneling apparatus according at a low-speed data rate based on a remote low-speed clock. The second output signal may be generated at the local wireless tunneling apparatus at the low-speed data rate based on a local low-speed clock signal, the second output signal at a substantially constant delay relative to the low-speed data input.

In one embodiment, a wireless transmitter is configured to (i) encode a first input signal and a second input signal in a frame from the plurality of frames to generate a baseband transmit signal, the first input signal conforming to the high-speed wired communication protocol from the local processing apparatus, the second input signal conforming to the low-speed wired communication protocol from the local processing apparatus, (ii) upconvert the baseband transmit signal to generate a wireless transmit signal, and (iii) transmit the wireless transmit signal.

In one embodiment, the state machine is further configured to (i) predict a state of the low-speed wired communication protocol based on the second output signal and (ii) determine, based on the predicted state of the low-speed wired communication protocol, whether the wireless receiver is to decode the second receive portion of the wireless receive signal or the wireless transmitter is to encode the second input signal for transmission.

In one embodiment, the baseband transmit signal comprises a first transmit portion corresponding to a first time slot of the frame and a second transmit portion corresponding to a second time slot of the frame.

In one embodiment, the first receive portion and the first transmit portion are communicated during the first time slot of the frame, and the second receive portion and the second transmit portion are communicated during the second time slot of the frame.

In one embodiment, the low-speed wired communication protocol is I2C or GPIO.

In one embodiment, content stored in the register is written or read by the local processing apparatus through the low-speed wired communication protocol.

In one embodiment, the second output signal indicates a connection status between the remote processing apparatus and the remote wireless tunneling apparatus.

In one embodiment, the second output signal indicates a communication status between the remote wireless tunneling apparatus and the local wireless tunneling apparatus.

In one embodiment, the second output signal indicates whether the remote wireless tunneling apparatus is placed on a predetermined location.

In one embodiment, the second output signal controls the local wireless tunneling apparatus to change a state of the high-speed communication protocol.

BRIEF DESCRIPTION OF THE DRAWINGS

The teachings of the embodiments disclosed herein can be readily understood by considering the following detailed description in conjunction with the accompanying drawings.

DETAILED DESCRIPTION

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIG.) and the following description relate to the preferred embodiments by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Embodiments herein are primarily described in the context of a tunneling system that can be plugged into an arbitrary node in a connected topology, comprising hosts, devices, and hubs. In some embodiments, the wireless tunneling may operate in the context of a USB 3.0 system. However, the embodiments herein may also be used to communicate using other communication protocols such as different versions of the USB standard or entirely different protocols such as HDMI, DisplayPort, or other serial communication protocols.

Figure 1:
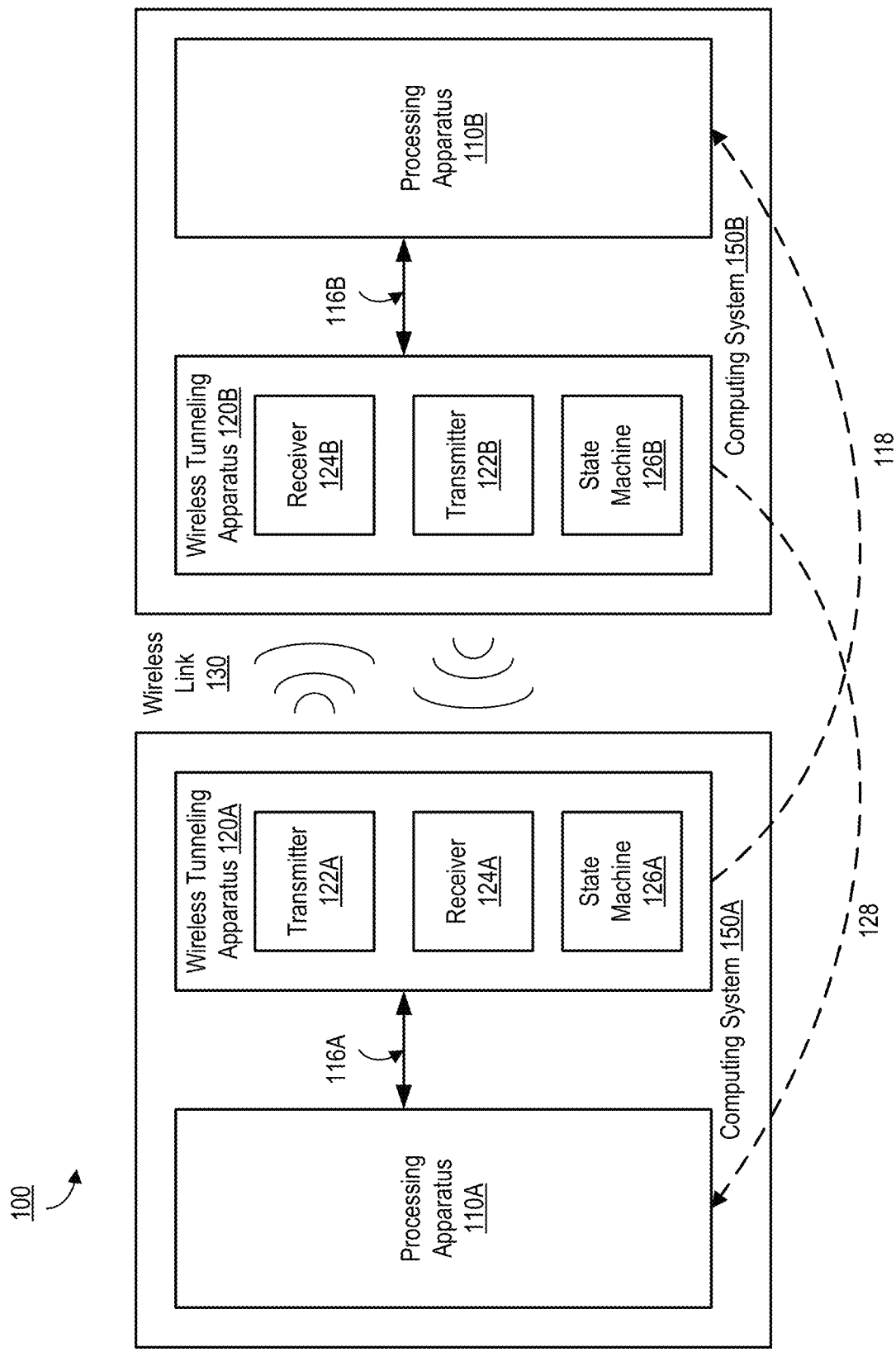
FIG. 1 illustrates one embodiment of a wireless tunneling system.

FIG. 1 illustrates an embodiment of a wireless tunneling system 100. The wireless tunneling system 100 comprises a first computing system 150A communicating with a second computing system 150B via a wireless link 130.

In one embodiment, the wireless link 130 comprises a 60 GHz wireless link. The wireless link 130 may be limited to short range communications where the wireless tunneling apparatuses 120 are in very close proximity to each other (e.g., within a few millimeters). Data transmissions over the wireless link 130 may have a data rate of, for example, 6 Gigabits per second or higher. In other embodiments, the wireless link may be suitable for a long range communications and/or implemented for other frequency bands.

The first computing system 150A includes a processing apparatus 110A coupled to a wireless tunneling apparatus 120A through a wired connection 116A, and the second computing system 150B includes a processing apparatus 110B coupled to a wireless tunneling apparatus 120B through a wired connection 116B. The wireless tunneling apparatuses 120A and 120B (also may be referred to as "wireless tunneling apparatuses 120" or "transceivers 120") communicate with each other through the wireless link 130, and tunnel communications between the processing apparatuses 110A and 110B (herein also referred to as "processing apparatuses 110" or "source apparatuses 110"). A processing apparatus can include an electronic apparatus able to exchange data (unidirectional or bidirectional) compliant with a wired communication protocol with another electronic apparatus. Examples of a processing apparatus include a source device, a sink device, an intermediate device between the source device and the sink device, USB host/device, a storage device, etc. In one embodiment, the wireless tunneling apparatus 120 is embodied as a removable dongle that can couple to a port or cable of the processing apparatus 110 (e.g., a USB port or cable, a HDMI port or cable, or a DisplayPort port or cable). In other embodiments, the wireless tunneling apparatus 120 is internally coupled to the processing apparatus 110 (e.g., via traces on a printed circuit board) or may be fully integrated with the processing apparatus 110 (e.g., in an integrated circuit).

The computing system 150 (and the components thereof) may be implemented using analog circuit components, digital logic, software, or a combination thereof. In one embodiment, one or more components of the computing system 150 may be implemented as a processor and a non-transitory computer-readable storage medium storing instructions that when executed by the processor cause the processor to carry out the functions attributed to the components. Alternatively, or in addition, digital components may be implemented as an application specific integrated circuit (ASIC), field-programmable gate array (FGPA), or using a combination of implementations.

In one embodiment, the wireless tunneling system 100 provides a replacement for conventional wired communications such as USB, HDMI, DisplayPort, or other serial communication protocols. For example, rather than the processing apparatuses 110A, 110B communicating directly to each other via a traditional cable, the processing apparatuses 110A, 110B instead communicate with their respective wireless tunneling apparatuses 120A, 120B, which then tunnel the data over a high-speed point-to-point serial wireless link 130 at speeds exceeding those that can be achieved using traditional wired communications.

From the perspective of the processing apparatuses 110A, 110B, the communications may be implemented in the same way as if the processing apparatuses 110, 110B were directly connected in a conventional configuration. Thus, no modification to a conventional processing apparatus 110A, 110B is necessarily required (e.g., no software modification is necessary). In other words, the wireless tunneling apparatuses 120A, 120B and the wireless link 130 between them may operate as a direct replacement for a conventional cable. For example, each wireless tunneling apparatus 120A, 120B includes an interface that enables it to plug directly into a conventional cable interface of its respective processing apparatus 110A, 110B and the wireless tunneling apparatuses 120A, 120B facilitate communication such that it appears to the processing apparatuses 110A, 110B that they are directly connected. In alternative embodiments, the wireless tunneling apparatuses 120A, 120B may be integrated with their' respective processing apparatuses 110A, 110B.

Taking USB as an example, traditional wireless apparatuses with USB interface terminate the USB protocol in the wireless tunneling apparatus and re-encode data into a different wireless protocol for transmission. These traditional wireless apparatuses are visible as nodes (USB hubs, USB devices or USB repeaters) in the USB tree topology. In contrast, a wireless tunneling apparatus allows for USB link-layer data traffic to be transmitted without modifications at very low latency and without terminating the USB protocol layers. Hence, such wireless tunneling apparatuses are not visible in the USB topology.

In order to further simulate a wired connection, the wireless tunneling apparatuses 120A, 120B furthermore enable low data rate communications such as I2C or GPIO communications to be transmitted over the wireless link by embedding the low data rate communications along with the high speed USB data. This helps simplify system design of such wireless systems in many applications, such as, wireless docking.

In one embodiment, each wireless tunneling apparatus 120 communicates with its connected processing apparatus 110 to mirror the states and operations of a counterpart of the processing apparatus 110 to which the wireless tunneling apparatus 120 is coupled. Thus, for example, the wireless tunneling apparatus 120A mirrors the states of the processing apparatus 110B as indicated by an arrow 118, and the wireless tunneling apparatus 120B mirrors the processing apparatus 110A as indicated by an arrow 128. Accordingly, the data communicated from the wireless tunneling apparatus 120A to the processing apparatus 110A mirror communications from the processing apparatus 110B to the wireless tunneling apparatus 120B, and data communicated from the wireless tunneling apparatus 120B to the processing apparatus 110B mirror communications from the processing apparatus 110A to the wireless tunneling apparatus 120A.

In typical systems (e.g., USB systems), a connection is established between two processing apparatuses 110 in which one apparatus 110A operates as an upstream apparatus and the other apparatus 110B operates as a downstream apparatus. Similarly, in the context of a particular connection, one wireless tunneling apparatus 120A operates as an upstream apparatus and the other wireless tunneling apparatus 120B operates as a downstream apparatus. At different times, an apparatus 110, 120 may switch between operating as an upstream apparatus and a downstream apparatus. The apparatuses 110, 120 could be inserted into any part of the USB connection tree topology. Taking USB as an example, the wireless tunneling apparatuses 120A and 120B could be inserted between "host" and "device", "upstream hub" and "device," "host" and "downstream hub," and "upstream hub" and "downstream hub." The USB protocol allows for up to 5 layers of "hubs" besides the "host" and "device." For proper tunneling, the configurations (e.g., upstream or downstream) of the two wireless tunneling apparatuses 120 must be compatible with (i.e., counterpart to) each other. Furthermore, in the terminology used herein, the configuration of the processing apparatus 110 and the configuration of the wireless tunneling apparatus 120 coupled to the processing apparatus 110 through the wired connection 116 are matched (i.e., same configuration).

In one embodiment, to enable proper communication, the wireless tunneling apparatuses 120 each determine whether the processing apparatus 110 to which they are respectively connected are operating as an upstream apparatus or downstream apparatus and then configure themselves accordingly to mirror the counterpart processing apparatus 110.

The wireless tunneling apparatus 120 comprises a transmitter 122, a receiver 124, and a state machine 126. The transmitter 122 receives data from the processing apparatus 110 and transmits the data over the wireless link 130 to a receiver 124 of a different computing system 150. The receiver 124 receives data over the wireless link 130 from a transmitter 122 of another computing system 150 and provides the received data to the processing apparatus 110. The state machine 126 controls the power state of the wireless tunneling apparatus 120 by switching the wireless tunneling apparatus between a high power state for transmitting high frequency data and one or more low power states as will be described in further detail below. The wireless tunneling apparatuses 120 furthermore mimic low-power states signaled within the tunneled protocol. In an embodiment, the wireless tunneling apparatus 120 is capable of full-duplex communication so that it may transmit and receive data over the wireless link 130 simultaneously.

For example, in the illustrated embodiment, the processing apparatus 110A is configured as an upstream apparatus and operates according to the state machine 126A as a "host" (or an "upstream hub"), where the processing apparatus 110B is configured as a downstream apparatus and operates according to the state machine 126B as a "device" (or "downstream hub"). The processing apparatus 110A, functioning as the "host," controls operations of or communication with the processing apparatus 110B, functioning as the "device." The upstream wireless tunneling apparatus 120A interfaces the upstream processing apparatus 110A (or "host") through the wired connection 116A, and similarly the downstream wireless tunneling apparatus 120B interfaces the downstream processing apparatus 110B ("device") through the wired connection 116B. Thus, an indication of upstream/downstream configuration of the local processing apparatus 110A can also indicate the configuration of the wireless tunneling apparatus 120A, and vice versa. The wireless tunneling apparatuses 120A and 120B exchange data including status, states, or control information of respective processing apparatuses 110 over the wireless link 130.

In one embodiment, a wireless tunneling apparatus 120 of one configuration does not perform or replicate the operation of a local processing apparatus 110 of the same configuration, but rather performs or replicates the state and operation of a local processing apparatus 110 of the counterpart configuration. That is, the upstream wireless tunneling apparatus 120A interfacing the upstream processing apparatus 110A through the wired connection 116A mirrors the state and operation of the downstream processing apparatus 110B (e.g., in the context of a USB connection, the upstream wireless tunneling apparatus 120A mirrors a "device"), according to the state machine 126A. By the same token, the downstream wireless tunneling apparatus 120B interfacing the downstream processing apparatus 110B through the wired connection 116B mirrors the state and operation of the upstream processing apparatus 110A (e.g., in the context of a USB connection, the downstream wireless tunneling apparatus 120B mirrors a "host") according to the state machine 126B.

In one embodiment, the wireless tunneling apparatuses 120A, 120B are substantially identical apparatuses. Alternatively, the wireless tunneling apparatuses 120A, 120B are different complementary apparatus types that have similar high level architectures, but differ in certain architectural or operational characteristics as described herein. For example, in one embodiment, the first wireless tunneling apparatus 120A comprises a first apparatus type configured to operate with a processing apparatus 110A embodied as a docking station, while the second wireless tunneling apparatus 120B comprises a second apparatus type configured to operate with a processing apparatus 110B embodied as a mobile apparatus. In one embodiment, in order to implement full-duplex communication, complementary wireless tunneling apparatuses 120 of different types have different antenna polarization so that two different transmitter/receiver antenna pairs can simultaneously operate in both directions. For example, the wireless tunneling apparatus 120A may have a type X transmit antenna and a type Y receive antenna, while the wireless tunneling apparatus 120B has a complementary type Y transmit antenna and a type X receive antenna. Furthermore, wireless tunneling apparatuses 120 of different types may operate according to different control schemes in order to optimize the power efficiency of one of the wireless tunneling apparatuses 120 in the pair. For example, when the first wireless tunneling apparatus 120A is configured for operating with a docking station and the second wireless tunneling apparatus 120B is configured for operating with a mobile computing apparatus, the wireless tunneling apparatuses 120A, 120B may operate asymmetrically in order to lower the power consumption of the wireless tunneling apparatus 120B hosted by the mobile computing apparatus at the expense of the wireless tunneling apparatus 120B hosted by the docking station. This tradeoff may be desirable because a docking station is typically connected to a continuous power source, while a mobile computing apparatus depends on a battery with limited power.

In one embodiment, the apparatus type associated with a wireless tunneling apparatus 120 (and the operation associated therewith) may be permanently designed into the wireless tunneling apparatus 120. Alternatively, a wireless tunneling apparatus 120 may be configurable between two or more apparatus types based on a switch, a control pin (i.e., control input of a chip), or register setting. Architectural and/or operational differences between the different configurations of the wireless tunneling apparatuses 120A, 120B in a complementary pair are described in further detail below.

Figure 2:
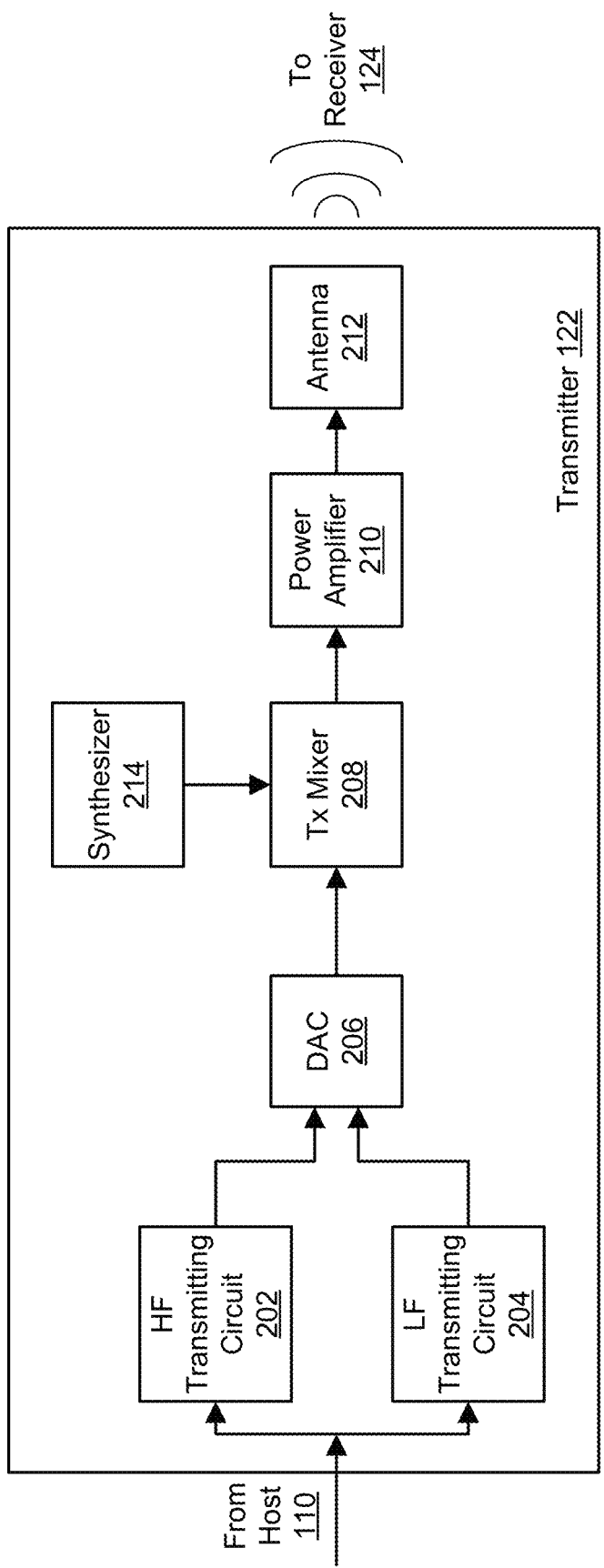
FIG. 2 illustrates an example embodiment of a transmitter of the wireless tunneling apparatus.

FIG. 2 illustrates an example embodiment of a transmitter 122 (e.g., transmitter 122a or transmitter 122b). The transmitter 122 includes a high frequency (HF) transmitting circuit 202, a low frequency (LF) transmitting circuit 204, and a shared transmit data path comprising a digital-to-analog converter (DAC) 206, a transmit (Tx) mixer 208 (herein also referred to as "an up-converter circuit"), a synthesizer 214, a power amplifier 210, and an antenna 212. A high frequency transmit data path comprises the HF transmitting circuit 202 and may operate together with or include the shared transmit data path. Similarly, a low frequency transmit data path comprises the LF transmitting circuit 204 and may operate together with or include the shared transmit data path.

The HF transmitting circuit 202 provides an interface with the processing apparatus 110 for receiving digital data, and generates a high data rate (e.g., 6 Gbps) digital baseband signal (herein also referred to as "a first baseband transmit signal"). For example, in one embodiment, the HF transmitting circuit 202 receives serial data conforming to a USB protocol, an HDMI protocol, a DisplayPort protocol, or other communication protocol and generates a high-speed signal suitable for wireless transmission.

The LF transmitting circuit 204 generates a low data rate signal (herein also referred to as "a second baseband transmit signal") that has a substantially lower data rate than the high data rate signal produced by the HF transmitting circuit 202. The low data rate signal typically comprises control signals used to communicate control or state information such as, for example, information for operating in or transitioning between a proximity detection state or an attachment/detachment state, and other state information used for controlling the power state of the wireless tunneling apparatus 120.

The digital-to-analog converter 206 converts the high speed and low speed signals from the HF transmitting circuit 202 and LF transmitting circuit 204 respectively from the digital domain to the analog domain to generate an analog baseband signal. The Tx mixer 208 upconverts the analog baseband signal to a radio frequency signal based on a carrier signal (generated by the synthesizer 214) to generate an up-converted signal. The power amplifier 210 amplifies the up-converted signal to generate an amplified signal (herein also referred to as "a wireless transmit signal") transmitted by the antenna 212 over the wireless link 130. In one embodiment, the power amplifier 210 comprises a multi-stage power amplifier that amplifies the up-converted signal in a manner that meets output power and linearity requirements. As described above, the antenna 212 may be of different type depending on whether the transmitter 122 is a first apparatus type (e.g., for use with a wall-powered dock apparatus) or as second apparatus type (e.g., for use with a battery-powered mobile apparatus).

The state machine 126 controls the power state of the various components of the transmitter 122 depending on an operational state of the transmitter 122 in order to improve power efficiency of the transmitter 122. For example, because the power consumption of the HF transmitting circuit 202 is relatively high compared to the LF transmitting circuit 204, the state machine 126 can control the HF transmitting circuit 202 to operate in a low power state or turn off the HF transmitting circuit 202 during a low frequency transmission when the HF transmitting circuit 202 is not being used. During high frequency transmissions, the LF transmitting circuit 204 may be powered down. Furthermore even during proximity detection (as will be described later), since the LF transmitting circuit 204 transmit operations generally happen relatively infrequently, the state machine 126 can turn off power to the digital-to-analog converter 206, Tx mixer 208, synthesizer 214, and power amplifier 210 during periods when neither the HF transmitting circuit 202 nor the LF transmitting circuit 204 are operational. This duty-cycling of the transmit data path lends itself to lower power consumption when averaged over time.

Figure 3:
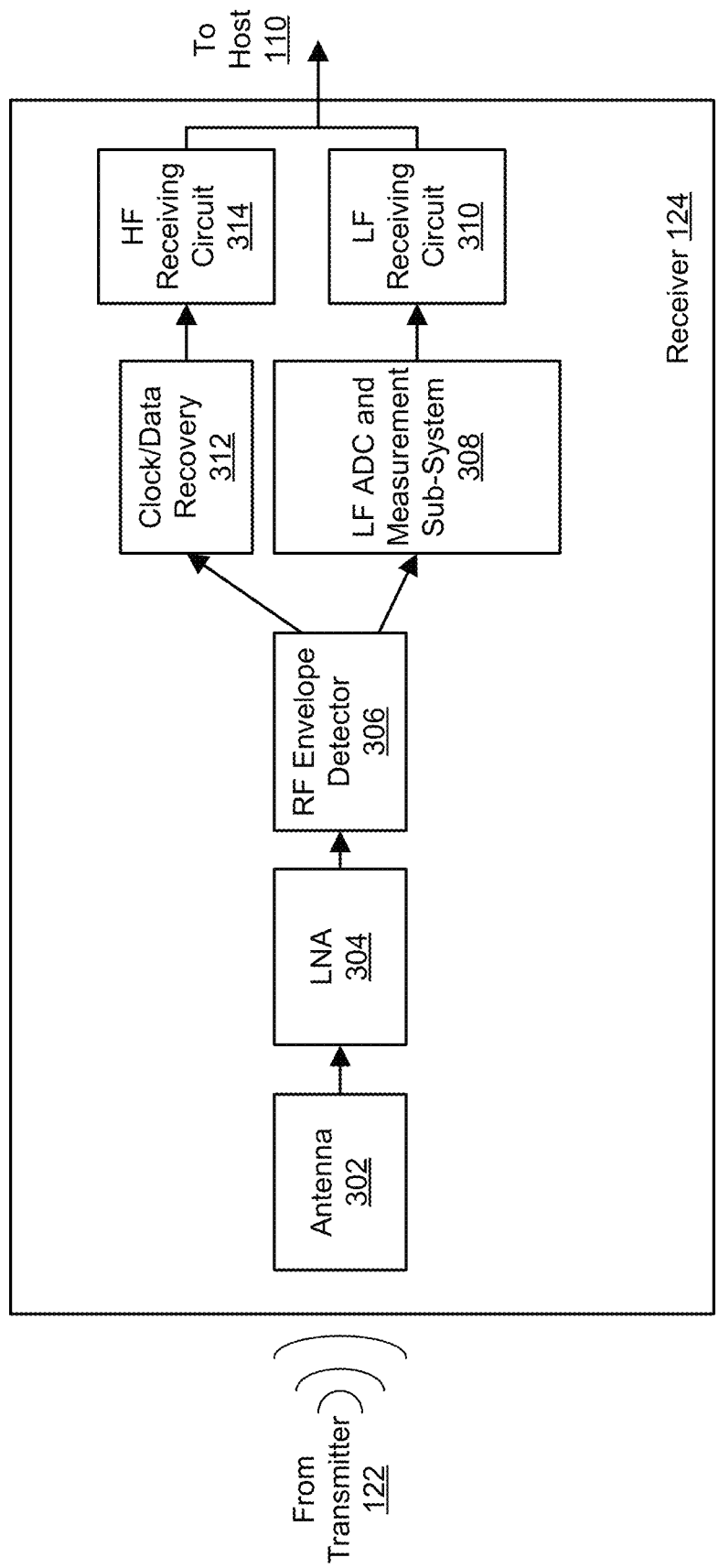
FIG. 3 illustrates an example embodiment of a receiver of the wireless tunneling apparatus.

FIG. 3 illustrates an example embodiment of a receiver 124 (e.g., receiver 124a or 124b). The receiver 124 includes a shared receive data path comprising an antenna 302, a low noise amplifier (LNA) 304, and a down-converter circuit (e.g., a radio frequency (RF) envelope detector 306); a high frequency receive data path including a clock/data recovery circuit 312 and a high frequency receiving circuit 314; and a low frequency receive data path including a low frequency analog-to-digital converter and measurement sub-system 308, and a low frequency receiving circuit 310. The high frequency receive data path may operate together with or include the shared receive data path. Similarly, the low frequency receive data path may operate together with or includes the shared receive data path.

The antenna 302 receives a wireless signal (herein also referred to as "a wireless receive signal") via the wireless link 130 which is amplified by the low noise amplifier 304. As described above, the antenna 302 may be of different type depending on whether the receiver 124 is a first apparatus type (e.g., for use with a dock apparatus) or as second apparatus type (e.g., for use with a mobile apparatus). The low noise amplifier 304 provides gain and incorporates automatic gain control to ensure an optimal signal level at the input of the RF envelope detector 306. The RF envelope detector 306 demodulates the amplified wireless signal (or amplified RF signal) by detecting an envelope of the amplified signal to recover a baseband signal (herein also referred to as "a baseband receive signal"). For example, in one embodiment, the RF envelope detector 306 applies a non-linear (e.g., square law) amplification to rectify the amplified RF signal, and then filters out the high-frequency components to provide the baseband signal.

In the high frequency receive data path, the clock/data recovery circuit 312 recovers a clock signal implicit in the baseband signal and uses the clock signal to recover high speed data. The HF receiving circuit 314 processes the high speed data signal and generates a signal (herein also referred to as "receive data") suitable for interfacing to the processing apparatus 110. For example, the HF receiving circuit 314 generates a data signal conforming to the USB protocol, HDMI protocol, DisplayPort protocol, or other data protocol associated with the processing apparatus 110.

In the low frequency receive data path, the LF ADC and measurement sub-system 308 converts the baseband signal to a digital representation and provides the digital signal to the LF receiving circuit 310. The LF receiving circuit 310 processes the digital signal to generate a signal representing control (herein also referred to as "a control signal" or "control information") for providing to the state machine 126 or status information for providing to the processing apparatus 110.

The state machine 126 controls the power state of the various components of the receiver 124 depending on an operational state of the receiver 124 in order to improve power efficiency of the receiver 124. For example, because the power consumption of the HF receiving circuit 314 is relatively high compared to the LF receiving circuit 310, the state machine 126 can control the HF receiving circuit 314 to operate in a low power state or turn off the HF receiving circuit 314 during a low frequency transmission when the HF receiving circuit 314 is not being used. Similarly, the clock/data recovery circuit 312 can be powered down during a low frequency transmission. During high frequency transmissions, the low frequency components such as LF receiving circuit 310 may be powered down.

The architecture of the low frequency receive data path is well suited for low power operation. In contrast to a conventional receive architecture, the receive data path of the receiver 124 does not include a synthesizer, which typically consumes substantial power in a traditional receiver architecture. Instead, the receiver 124 can recover both the low and high frequency transmissions based on envelope detection, thereby operating at significantly lower power than a traditional receiver. This low-power RF architecture based on on-off keying and using RF envelope detector 306 does not depend on a fixed local oscillator frequency.

Figure 4:
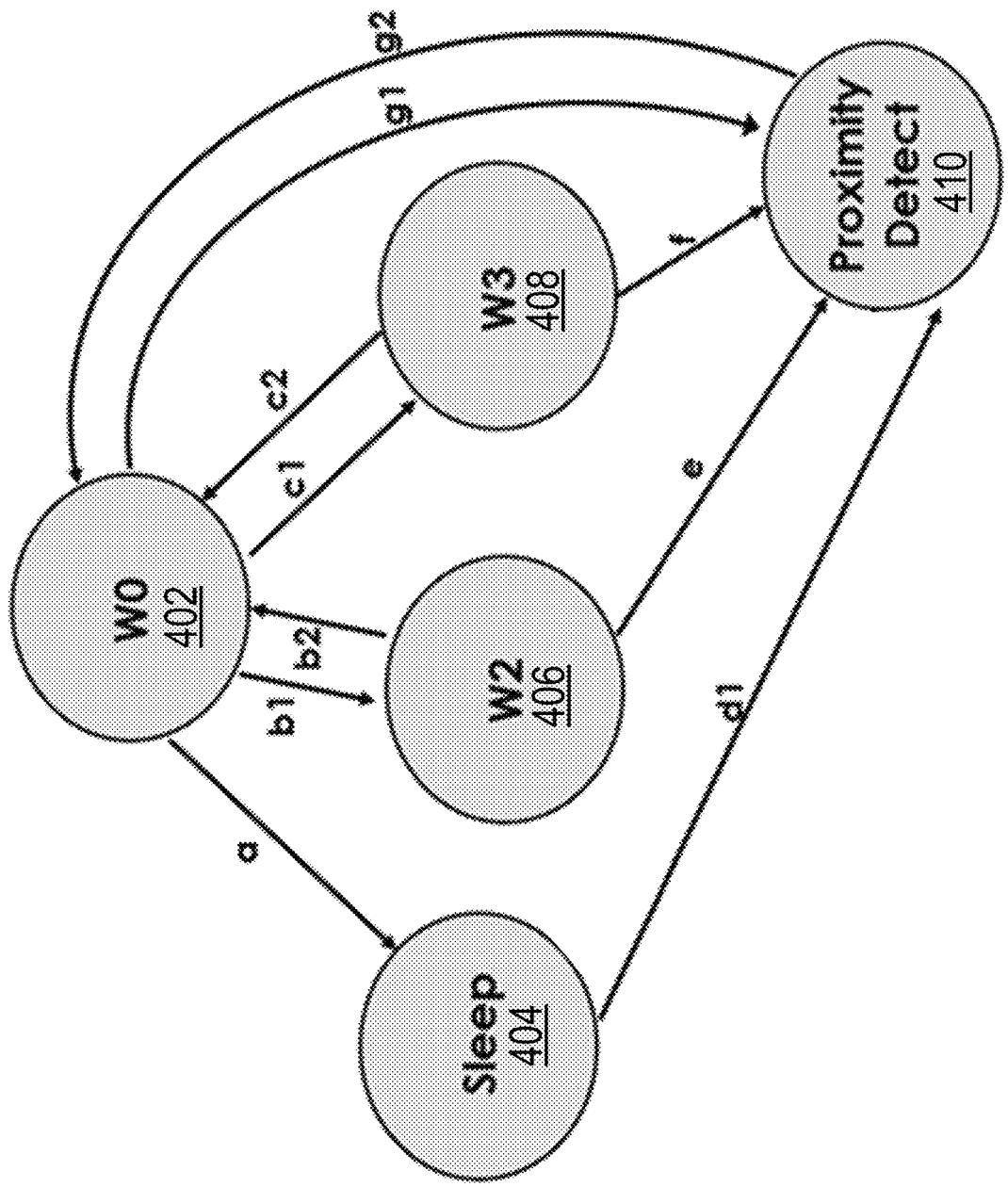
FIG. 4 illustrates an example state transition diagram of a wireless tunneling apparatus capable of tunneling USB data, according to one embodiment.

FIG. 4 illustrates an example state transition diagram for a wireless tunneling system capable of tunneling USB data, according to one embodiment. In this embodiment, five possible power states are available: a W0 state 402, a W2 state 406, a W3 state 408, a proximity detect state 410, and a sleep state 404. The W0 state 402 represents the high power state in which the high frequency transmitting circuit 202, high frequency receiving circuit 314, and associated components are enabled, and the wireless tunneling apparatus 120 is actively transmitting, or is available and ready to transmit, high frequency serial data (e.g., USB data).

In the W0 state, the high frequency transmitting circuit 202 and the high frequency receiving circuit 314 are turned on and the wireless tunneling apparatus 120 may actively tunnel USB data. If proximity to the other apparatus is lost, the wireless tunneling apparatus 120 transitions to the proximity detect state 410. In the proximity detect state 410, the high frequency transmitting circuit 202 and high frequency receiving circuit 314 are turned off. The low frequency transmitting circuit 204 and low frequency receiving circuit 310 are turned on to periodically check for proximity to another apparatus and are turned off when not being used. A wireless tunneling apparatus pair 120A and 120B may enter the sleep state 404 from the W0 state if proximity detection is successful but the processing apparatus 110 is determined to be not attached. This determination is made in the W0 state 402. In the sleep state 404, only "always-on" blocks are running and other components are turned off for power efficiency. The wireless tunneling apparatus remains in the sleep state 404 for a pre-defined time, and then goes back to the proximity detect state 410 to make sure that wireless proximity is maintained. If a nearby apparatus is detected, the wireless tunneling apparatus 120 transitions back to the W0 state 402 in which attachment of the processing apparatus is checked. The W2 and W3 states 406, 408 are entered when a wireless tunneling apparatus pair 120A/120B is in wireless proximity, the processing apparatuses 110A/110B are in attached state, but the processing apparatuses 110 are in a low power state or are not actively communicating data. For example, the W2 state 406 is entered when the processing apparatus 110 is in a "U2" low-power state of USB3.0 Superspeed, and the W3 state 408 is entered when the processing apparatus 110 is either in "U3" state of USB3.0 Superspeed or in "Suspend" state of USB2.0 Highspeed.

Each are in FIG. 4 represents a possible transition between states. The conditions for transitioning between the states are summarized in the table and described in more detail below.

TABLE 1

State Transition for Wireless Tunneling Apparatus

| ARC | Local apparatus requirements | Remote apparatus requirements |
|---|---|---|
| a | USB2.0 disconnected and USB3.0 disabled | proposed_link_state == SLEEP |
| b1 | USB2.0 disconnected or suspended and USB3.0 in U2 state. | proposed_link_state == W2 |
| b2 | USB2.0/USB3.0 wakeup event locally or remotely | n/a |
| c1 | USB2.0 disconnected or suspended and USB3.0 in U3 state | proposed_link_state == W3 |
| c2 | USB2.0/USB3.0 wakeup event locally or remotely | n/a |
| d1 | Sleep timer times out | n/a |
| e | Wireless keep-alive signal not seen for N seconds | n/a |
| f | Wireless keep alive signal not seen for N seconds | n/a |
| g2 | Into W0: Proximity is detected | n/a |
| g1 | HF wireless Link is lost by HF synchronization state machine. | n/a |

Transitions out of the W0 state 402 (e.g., via arcs a, b1, c1, and g1) depend both on the state of the local wireless tunneling apparatus as well as the state of the remote wireless tunneling apparatus in proximity to the local wireless tunneling apparatus. In order to communicate the state of the local apparatus to the remote apparatus, and vice versa, a signal proposed_link_state is periodically transmitted between the apparatuses when in the W0 state 402 indicating the transition to a new state dictated by the local apparatus conditions. For example, in one embodiment, the signal proposed_link_state is a 2-bit signal encoding a state advertised by the local apparatus based on its conditions (e.g., '0' represents W0, '1' represents W2, '2' represents W3, and '3' represents Sleep). The signal proposed_link_state is periodically updated and exchanged over the wireless link when in the W0 state 402.

An apparatus advertises a transition to the sleep state 404 (arc a) when it detects that the processing apparatus 110 is disabled or disconnected. The apparatus advertises a transition to the W2 state 406 (arc b1) when it detects that USB2.0 has disconnected or suspended and USB3.0 has gone into U2 low-power state. The apparatus advertises a transition to the W3 state 408 (arc c1) when it detects that USB2.0 has disconnected or suspended and USB3.0 has gone into U3 state. The apparatus advertises a transition to the proximity detect state 410 when the HF wireless link (i.e., a wireless link 130 using high frequency transmit and receive data paths) is lost.

The state change out of W0 occurs only after both sides of the wireless link 130 advertise the same low power state (e.g., SLEEP, W2, or W3). Otherwise, both apparatuses remain in the W0 state 402. In the W0 state 402 the value of proposed_link_state is transmitted periodically. After both local and remote apparatuses advertise the same low power state, the apparatuses transition to that state.

Exiting from the W2 state 406 to the W0 state 402 (arc b2) is triggered by an upstream or downstream processing apparatus sending an exit event. For example, in USB3.0, the exit event may comprise a U2 exit LFPS (Low Frequency Periodic Signaling) to a wireless tunneling apparatus 120. In order for the W2 exit to occur, the wireless tunneling apparatus 120 transmits back a handshake LFPS with low enough latency to meet the requirements of the underlying serial protocol (e.g., 2 ms for USB3.0 links). In one implementation, the fast W2 exit is facilitated by keeping all phase-locked loops (PLLs) powered when operating in the W2 state 406.

Figure 5:
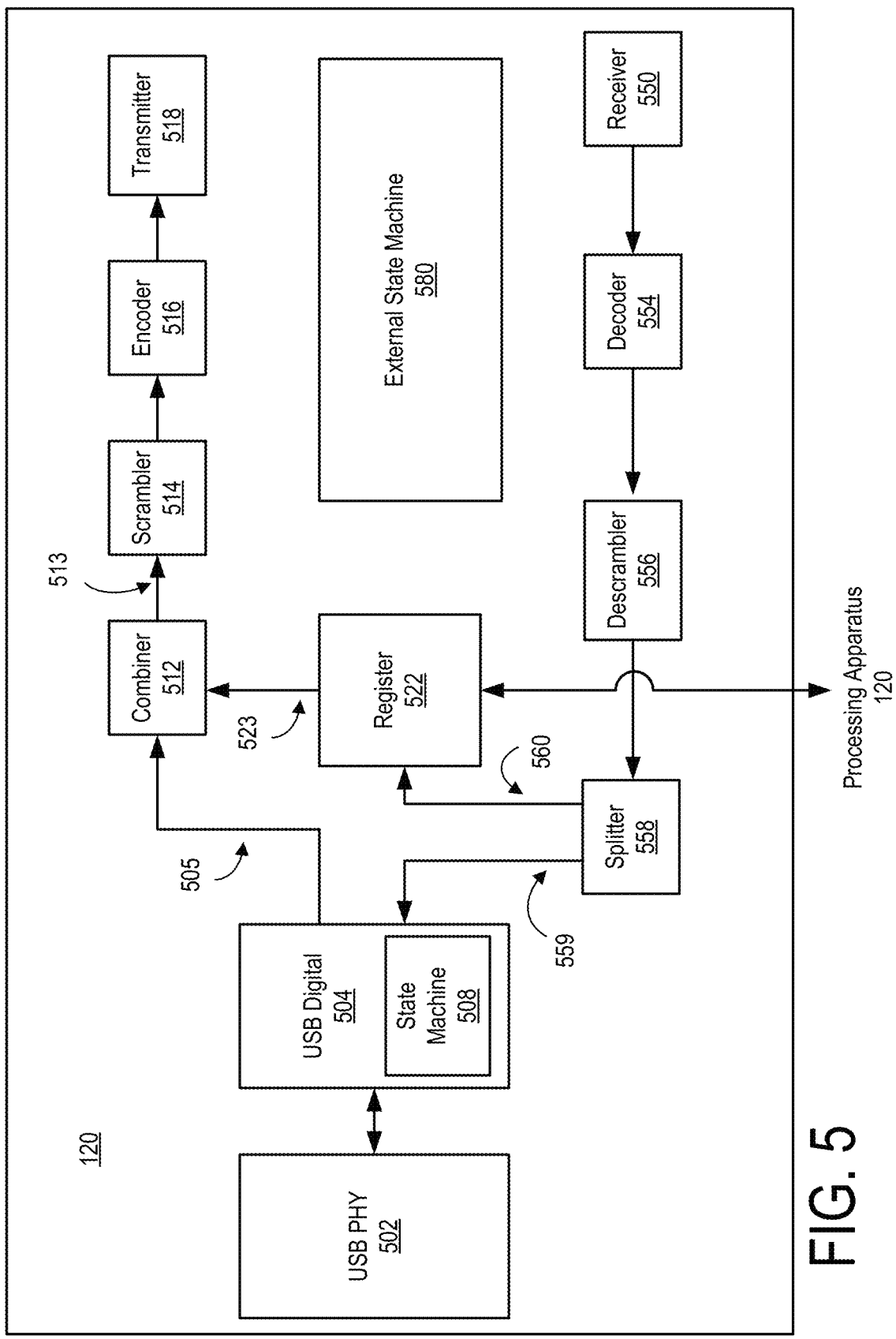
FIG. 5 illustrates a detailed architecture of a wireless tunneling apparatus, according to one embodiment.

FIG. 5 shows a detailed architecture of a wireless tunneling apparatus 120, according to one embodiment. While the diagram in FIG. 5 may correspond to the wireless tunneling apparatuses 120 illustrated in FIG. 1, it illustrates an example in further detail in order to better explain operation of the apparatuses 120 in accordance with one embodiment. In one embodiment, the wireless tunneling apparatus 120 includes a full-duplex high speed data-path capable of tunneling at USB 3.0 speeds. In one implementation, the wireless tunneling apparatus 120 includes a USB PHY 502, USB digital 504, a combiner 512, a scrambler 514, an encoder 516, a transmitter 518, an external state machine 580, a splitter 558, a descrambler 556, a decoder 554, and a receiver 550. In one embodiment, the transmitter 518 is the transmitter 122 of FIG. 1, the receiver 550 is the receiver 124 of FIG. 1, and the external state machine 580 (or a state machine 508 of the USB digital 504, or a combination of both) is the state machine 126 of FIG. 1. Additional components in FIG. 5 that are not shown in FIG. 1 are implemented for a proper communication conforming to USB protocol. Together, these components operate to tunnel communications between two processing apparatuses 110 through two or more wired communication protocols.

The USB PHY 502 is a mixed-signal interface circuit that is in one embodiment fully compliant with USB3.0 electrical specification and supports all four different USB speeds: super-speed (5 Gbps), high-speed (480 Mbps), full-speed (12 Mbps), and low-speed (1.5 Mbps). It supports the full range of USB3.0 host and peripheral applications.

The USB PHY 502 provides digital interfaces compliant with PIPE3.0 (for SS) and UTMI+(for HS/FS/LS). The UTMI+ provides two interfaces for FS/LS: standard 8-bit/16-bit interface or bit-serial interface. An embodiment of the tunneling architecture described herein uses the bit-serial interface in order to minimize end-to-end latency across the two wireless tunneling apparatuses 120. The bit-serial interface saves time to serialize and de-serialize bit data.

The USB PHY 502 implements reduced power consumptions for all low power states defined in USB3.0 specification: U0/U1/U2/U3 for super-speed and suspend-resume for HS/FS/LS. It also supports the transmission and reception of Low Frequency Periodic Signaling (LFPS), as defined in the specification, for exiting from low power states.

USB super-speed data over a USB cable has a raw speed of 5 Gbps, out of which 20% is contributed by 8b/10b coding. This is prescribed in the USB standard to protect against cable related bit errors. As will be described below, this overhead is removed for wireless transmission and super-speed data bandwidth is reduced to 4 Gbps. Instead error correction codes are added for wireless transmission, so that wireless related bit errors can be detected and corrected.

The USB digital 504 tracks USB power states and apparatus states (e.g., attached/detached). This enables the wireless tunneling apparatus 120 to take advantage of the many USB 3.0 provisions for saving power consumption, such as for example, U0, U1, U2, and U3 states. In an embodiment, the USB digital state machine 508 includes an adapted implementation of Link Training and System Status Machine (LTSSM) from USB3.0 specification and Reset Protocol State Machine (RPSM) from USB2.0 specification. These link-layer state machines maintain states of host apparatus 110A and device apparatus 110B on opposite side of the wireless link, as shown in FIG. 1, thereby allowing seamless connections between a USB host apparatus 110A and USB device apparatus 110B as if there were no wireless tunneling apparatus 120 between the two.

The USB payload for wireless transmission comprises either USB packet data directly from USB PHY 502 or signaling information generated by the state-machines 508 inside USB digital 504.

The Link Training and Status State Machine (LTSSM) in USB3.0 specification is a state machine defined for link connectivity and link power management. The state-machine 508 is designed to track the LTTSM state of the USB host/device/hub on the opposite side of the wireless link, as shown in FIG. 1.

The state machine 508 facilitates components within the wireless tunneling apparatus 120 (e.g., digital, mixed-signal, and radio blocks) to go into different power states based on power state of the USB link. In one example, the wireless logic supports four power states: W0, W2, W3, and Sleep. W0 is the normal operating mode of wireless tunneling apparatus 120 and consumes the highest power. It corresponds to USB U0 state. The other three states are low power states. Table 2 below summarizes the mapping.

TABLE 2

Mapping between USB LTSSM states and wireless power states

| LTSSM States (from USB3.0 Specification) | Wireless Power States |
|---|---|
| U1 | W0 |
| U2 | W2 |
| U3 | W3 |
| SS.Disabled, SS.Inactive, Rx.Detect | Loop between W0/Sleep |
| U0 and all other active states | W0 |

According to the corresponding state, the USB digital 504 receives input data from the local processing apparatus 110A through the USB PHY 502, and provides the first transmit communication signal corresponding to the input data to the combiner 512 for transmission to the remote processing apparatus 110B.

The combiner 512 receives a first transmit communication signal 505 compliant with a first wired communication protocol (e.g., high data rate) from the USB digital 504 and a second transmit communication signal 523 compliant with a second wired communication protocol (e.g., low data rate) from the register 522, then generates a combined signal 513 as an output to the scrambler 514. In one aspect, the combiner 512 combines the first transmit communication signal 505 and the second transmit communication signal 523 according to a frame structure 700 shown in FIG. 7. The combiner 512 thus enables transmission of data conforming to a low-speed serial transmission protocol such as I2C or GPIO data to be embedded in the high data rate (e.g., USB) data transmitted by the wireless tunneling apparatus. For example, I2C or GPIO data may be inserted into otherwise unused data slots in the frame protocol used for wirelessly transmitting the USB data. Details of the frame structure are described in below with respect to FIG. 7.

The scrambler 514 converts the output from combiner 512 into a binary sequence that is random. An unscrambled binary sequence may have undesirable properties such as non-zero DC bias (number of 0's and 1's are not same) or long runs of '1's or '0's. Such properties could be detrimental to the performance of analog and RF circuits inside transmitter 518. As shown in next section, the input of the encoder 516 (e.g., a forward error correction (FEC) encoder) appears as the systematic part of the FEC output, and is eventually coded into an analog signal. Therefore, without scrambling, these undesirable properties could be carried over on to the analog signal, which creates adverse effects in analog circuits. Statistically, the parity part of the FEC output is also randomized together with the input.

The encoder 516 encodes the scrambled sequence from the scrambler 514 with redundancy, so that the receiver side could possibly correct bit errors introduced during wireless transmission. The FEC used in one implementation is a (232, 216) Bose-Chaudhuri-Hocquenghem code (BCH code), which is a cyclic error-correcting code in which each output code-word has 232 bits for a given 216-bit sequence. BCH code beneficially has error correction capability and low encoding and decoding latency. The code is systematic, which implies that the first 216 bit output is just copied from the input sequence. The last 16 bits are encoded using a BCH code generator matrix.

The transmitter 518 receives the encoded signal from the encoder 516, upconverts the encoded signal and transmits the upconverted signal wirelessly. In one aspect, the transmitter 518 is implemented as the transmitter 122 described with respect to FIG. 2. In one example, the encoded signal from the encoder 516 is received by the DAC 206 of the transmitter 122, and upconverted by the TX mixer 208 of the transmitter 122 shown in FIG. 2. The upconverted signal is transmitted through the antenna 212 of the transmitter 122 shown in FIG. 2.

The receiver 550 receives a wireless receive signal from a transmitter of another wireless tunneling apparatus 120, and downconverts the wireless receive signal. In one aspect, the receiver 550 is implemented as the receiver 124 described with respect to FIG. 3. In one example, the wireless receive signal is received by the antenna 302 of the receiver 124, and downconverted by the RF envelope detector 306 of the receiver 124 shown in FIG. 3. The downconverted signal is output to the decoder 554 through the clock/data recovery circuit 312 of the receiver 124 shown in FIG. 3.

The decoder 554 receives the downconverted signal from the receiver 550, and decodes the recovered signal. In one embodiment, a hard-decision based BCH decoder is implemented. The FEC decoder first calculates the syndromes to indicate if there exists any bit error in the code-word. If so, the next step is to locate the error locations and flip the corresponding bits. The (232, 216) BCH code can correct up to two bit errors in a 232-bit code-word. This coding scheme improves bit errors that are independent and random.

The descrambler 556 receives the decoded signal from the decoder 554 and descrambles the decoded signal.

The splitter 558 receives the descrambled data and unpacks the frame-structure 700 of data bits to produce a first receive communication signal 559 compliant with the first wired communication protocol and a second receive communication signal 560 compliant with the second wired communication protocol. The splitter 558 provides the first receive communication signal 559 to the USB digital 504, and provides the second receive communication signal 560 to the register 522. Thus, the splitter 558 reverses the function of the combiner 512 by separating the high data rate communications (e.g., USB data) from the embedded low data rate communications (e.g., I2C or GPIO data), thus enabling the wireless tunneling apparatus to mimic the function of a conventional USB apparatus that contains I2C, GPIO, or other low speed communication protocols along with USB data.

In creating the first receive communication signal 559 and the second receive communication signal 560, the splitter 558 removes the embedded low data rate data (e.g., I2C or GPIO data) that was inserted by the combiner 512 of another wireless tunneling apparatus 120, provides the remaining high data rate data to the USB digital 504 and provides the low data rate data to the register 522. In one aspect, the register 522 can be implemented as a pipeline of two register bits per information bit provided by the splitter 558—current register bit and shadow register bit. The rules of outputting from register 522 and updating of current-shadow registers could be designed in a way such that it provides an additional layer of safeguard against wireless errors, left uncorrected by the decoder 554. For example, if the low data rate information bit is constant '1', any spurious '0' from the splitter 558 could be filtered out by the current-shadow register scheme. This is particularly important to avoid glitches (introduced by wireless errors) for slow interfaces like GPIO and I2C, for which a level-value is sampled multiple times at a rate much higher than the baud-rate of that interface.

In one embodiment, the USB digital 504 receives the first receive communication signal 559 and generates an output signal to the local processing apparatus 110A. In one aspect, the state machine 508 predicts a state of the remote processing apparatus 110B based on the first receive communication signal 559 and generates the output signal conforming to the first wired communication protocol. The output signal is transmitted to the local processing apparatus 110A through the USB PHY 502.

The register 522 interfaces the local processing apparatus 110A through a wired connection and may be used to store various status or control information communicated between the wireless tunneling apparatuses via the embedded low data rate communication protocol. The stored information can be accessed by the local processing apparatus 110A or can be communicated to the remote processing apparatus 110B or the remote wireless tunneling apparatus 120B via the low data rate communication protocol (e.g., GPIO or I2C protocol).

For example, in one application, the register 522 stores a status bit representing a connection state of the wireless tunneling apparatus. The status bit in register 522 of wireless tunneling apparatus 120A may indicate, for example, a connection status of the wireless tunneling apparatus 120B with the local processing apparatus 110B. In another example, the status bit in register 522 of wireless tunneling apparatus 120A may be used to indicate a communication connection status of the wireless tunneling apparatus 120A with another wireless tunneling apparatus 120B. For another example the output of the register 522 indicates whether the wireless tunneling apparatus 120 (either remote or local) is placed on a predetermined location (e.g., a docking station or a kiosk) and ready to communicate through the first wired communication protocol. In one embodiment, the status bit controls an on or off state of an LED connected to the local processing apparatus to indicate the connection status. This status bit may be communicated between the wireless tunneling apparatuses 120 via GPIO data embedded in the high data rate USB communications to enable the processing apparatuses to communicate via GPIO to carry out the same functions as if the apparatuses had a wired GPIO communication link.

Similarly, the register 522 may be coupled to an I2C port (e.g., typically two pins) of the processing apparatus 110. The wireless tunneling apparatus 120 may embed the I2C data from the register into the high data rate USB communications in order to enable the processing apparatuses 110 to carry out I2C communications in the same way as if they had a wired I2C connection to each other (which may be part of the USB link). The I2C data stored in the register 522 can be used, for example, by the external state machine 580 or another state machine to predict a state of the remote processing apparatus 110B. Specifically, the external state machine 580 can determine, based on the predicted state of the I2C communication protocol, whether the decoder 554 of the wireless receive path is to decode the second receive portion of the wireless receive signal containing the I2C data or whether encoder 516 of the wireless transmit path is to encode the second input signal containing I2C data for transmission. This is important for I2C protocol that is bidirectional (half duplex) in nature. In one example, the I2C communication protocol can be used to prompt a transition of a state of the wireless tunneling apparatus 120 (e.g., transition from one of the W0, W2, W3, sleep state, and proximity detection state to another). In one embodiment, for example, when the wireless tunneling apparatus 120 is in low power state because of inactivity in USB data transfer, the external state machine 580 can enable wireless components (e.g., the transmitter 122, the receiver 124, or both) to establish the wireless link based on toggles on the I2C pins.

The external state-machine 580 controls numerous other system functions including, for example:

(1) control power state of wireless blocks & USB PHY based on USB power state
(2) ensure synchronicity of USB host and device by reproducing the link response across the wireless link,
(3) detect detachment and attachment of USB host/device, and
(4) process change on VBUS pin from a local processing apparatus 110 of the type USB host and drive VBUS pin of a local processing apparatus 110 of the type USB device.

Figure 6A:
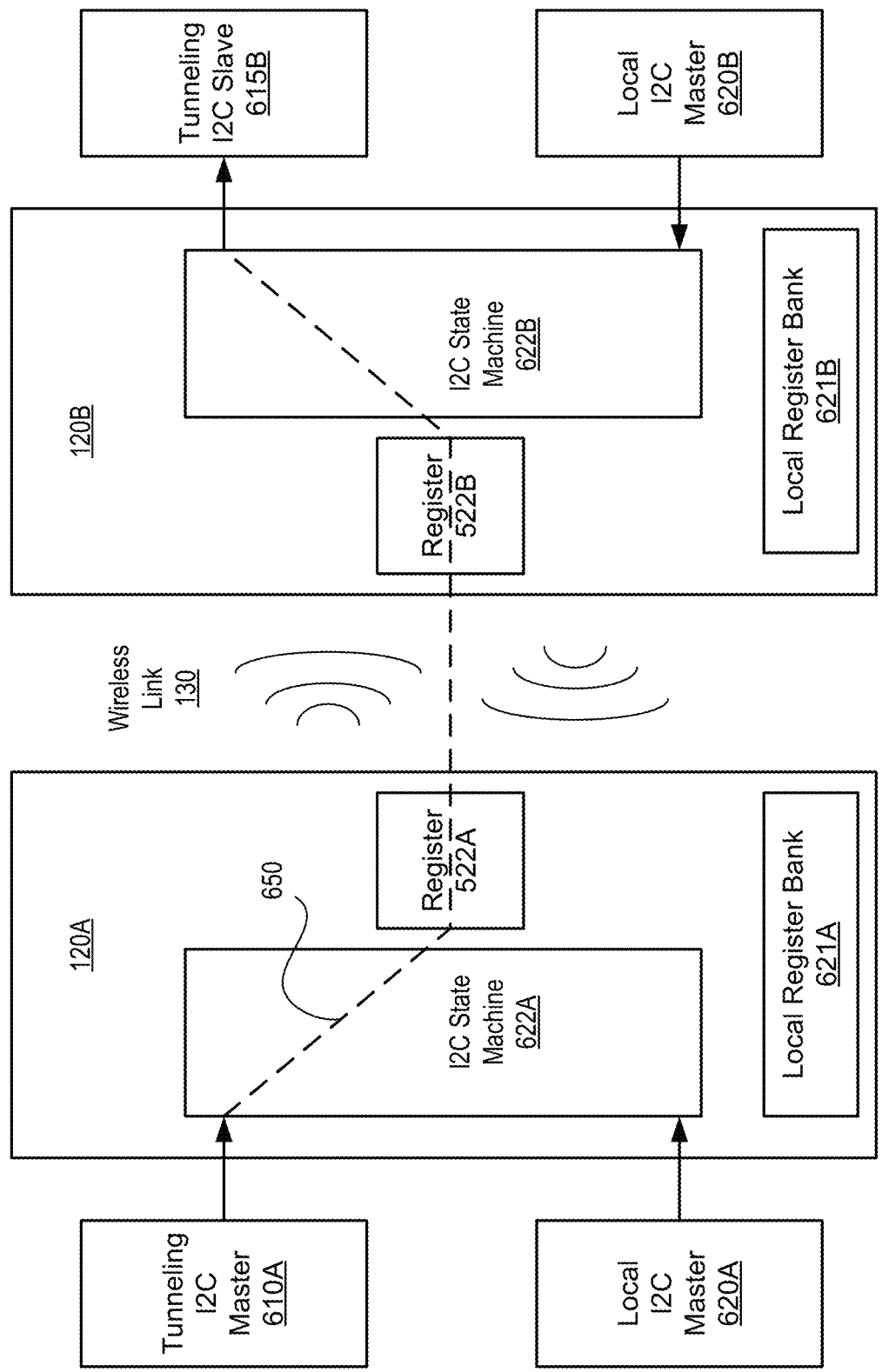
FIG. 6A illustrates two wireless tunneling apparatuses tunneling communication compliant with an inter integrated circuit (I2C) protocol between two processing apparatuses, according to one embodiment.

FIG. 6A illustrates two wireless tunneling apparatuses 120 tunneling communications compliant with I2C protocol between two processing apparatuses 110, according to one embodiment. In FIG. 6A, the tunneling I2C master 610A can be part of the local processing apparatus 110A, and the tunneling I2C slave 615B can be part of the remote processing apparatus 110B. The wireless tunneling apparatuses 120A and 120B tunnel communications compliant with I2C protocol through the wireless link 130 bidirectionally according to I2C state machines 622A and 622B in their respective wireless tunneling apparatus 120, as indicated by an arrow 650. In one aspect, the I2C state machine 622 can be part of the external state machine 580 or the state machine 508, and can be coupled to the register 522 of FIG. 5.

In this example, the tunneling I2C master 610A provides data to the I2C State machine 622A of the wireless tunneling apparatus 120A via a wired I2C link. The content stored in register 522A by the I2C state machine 622A is transmitted to the wireless tunneling apparatus 120B through the wireless link 130 as a low data rate signal embedded in the high data rate wireless communications. The content received from the local wireless tunneling apparatus 120A is stored in register 522B by the I2C State machine 622B, and is made accessible by the tunneling I2C slave 615B via a wired I2C link.

In one aspect, the I2C tunneling allows I2C bus to be extended across the wireless link 130 such that an I2C Master device can read/write data from an I2C Slave device on the remote side as if they were directly connected by a physical link without recognizing the wireless tunneling apparatus 120 in the middle.

Figure 7:
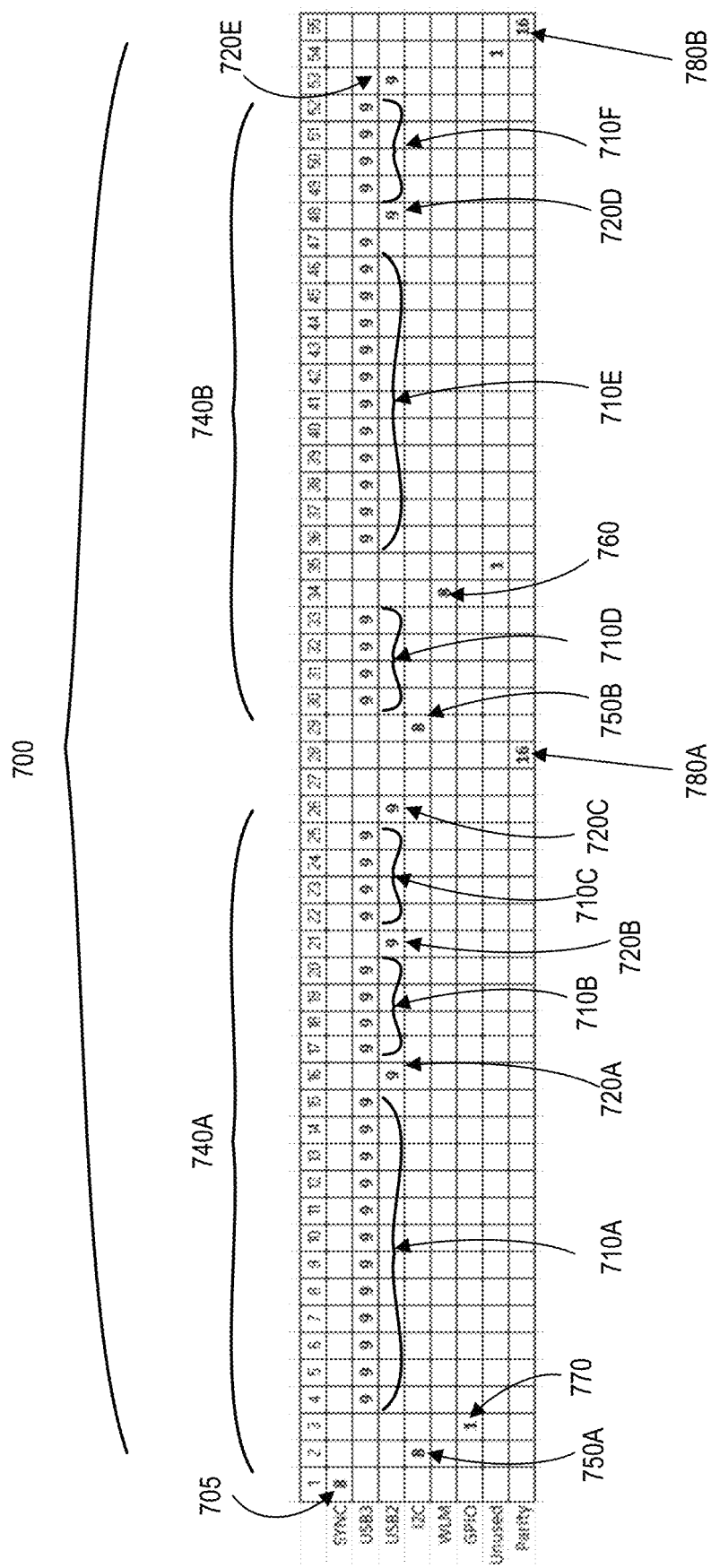
FIG. 7 illustrates an example frame structure for tunneling multiple protocols through a wireless link, according to one embodiment.

In one implementation, the I2C tunneling is implemented by sampling SCL (I2C clock) and SDA (I2C data) pins with a high-frequency clock (e.g., 187.5 MHz clock) and transmitting the samples in every frame-structure of the high speed (e.g., USB) communications as shown in FIG. 7 discussed below. During an I2C transaction the SCL and SDA pins are primarily driven by I2C Master, except for certain situations in which the I2C Slave drives the pins. These include I2C Acknowledgement bits and I2C read data bits. Therefore, tunneling I2C may utilize SCL and SDA samples transmitted in both directions simultaneously. The state-machine 580 (or I2C state-machine 622) follows the waveform of an I2C transaction and decides when the SCL/SDA pins need to be driven by remote samples, and when it does not.

The wireless data-path latency introduces delay between I2C interface pins of the two wireless tunneling apparatuses 120. This reduces hold and setup time margins that can be guaranteed on the wired I2C interface. One implementation supports standard-mode (100 Kbits/sec) and fast-mode (400 Kbits/sec) operations of I2C.

Figure 6B:
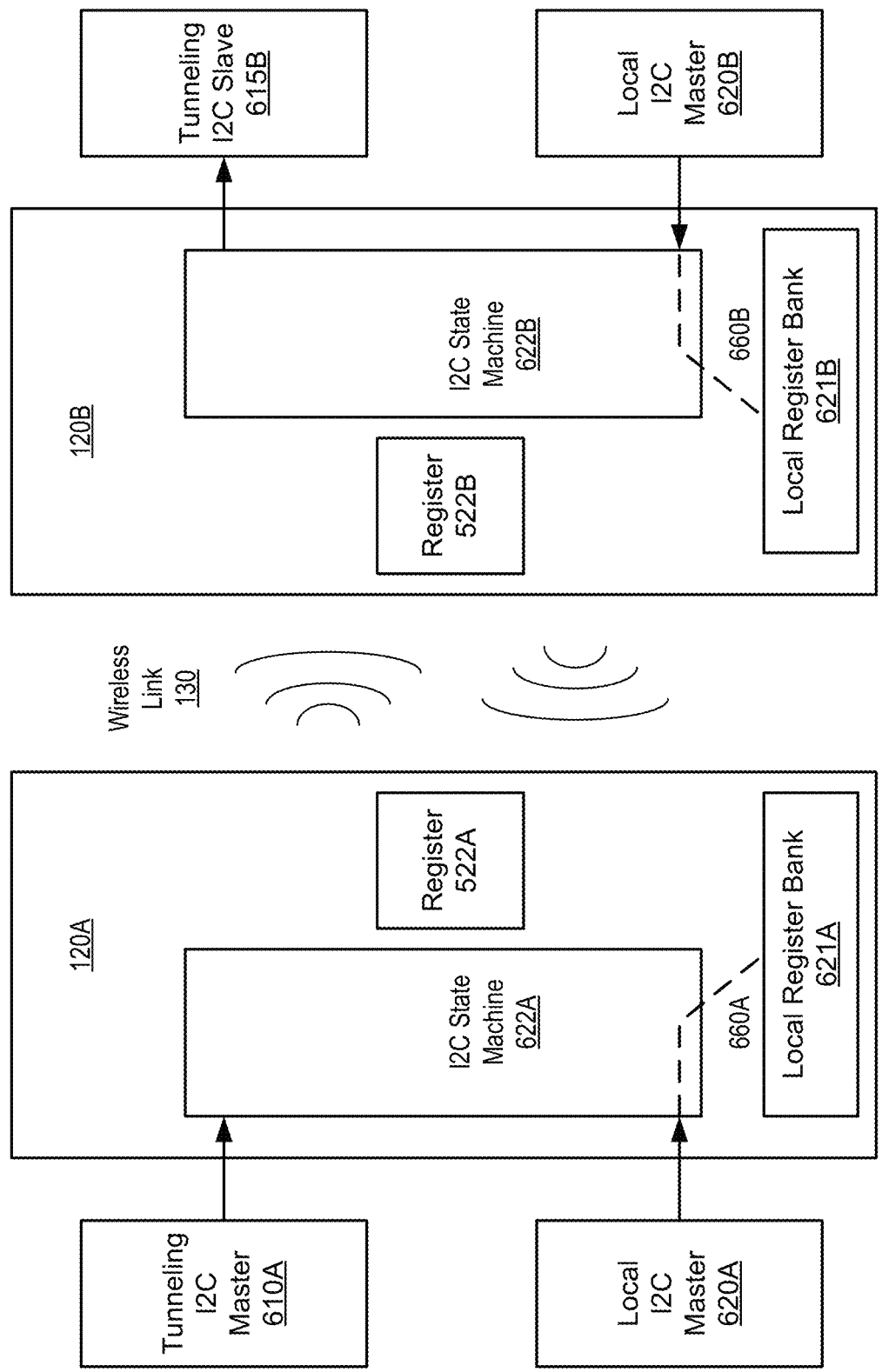
FIG. 6B illustrates the two processing apparatuses accessing register banks in its wireless tunneling apparatus using wired communication compliant with the I2C protocol, according to one embodiment.

FIG. 6B illustrates a conventional I2C access of local register bank 621. The local I2C master 620A (or 620B) can be part of the local processing apparatus 110A (or 110B). The local I2C master 620A (and likewise 620B) reads/writes contents of local register bank 621A (likewise 621B) via I2C state machine 622A (likewise 622B). The read-write accesses are provided through wired I2C interface and without using the wireless link 130, as indicated by the arrow 660A and 660B.

Figure 6C:
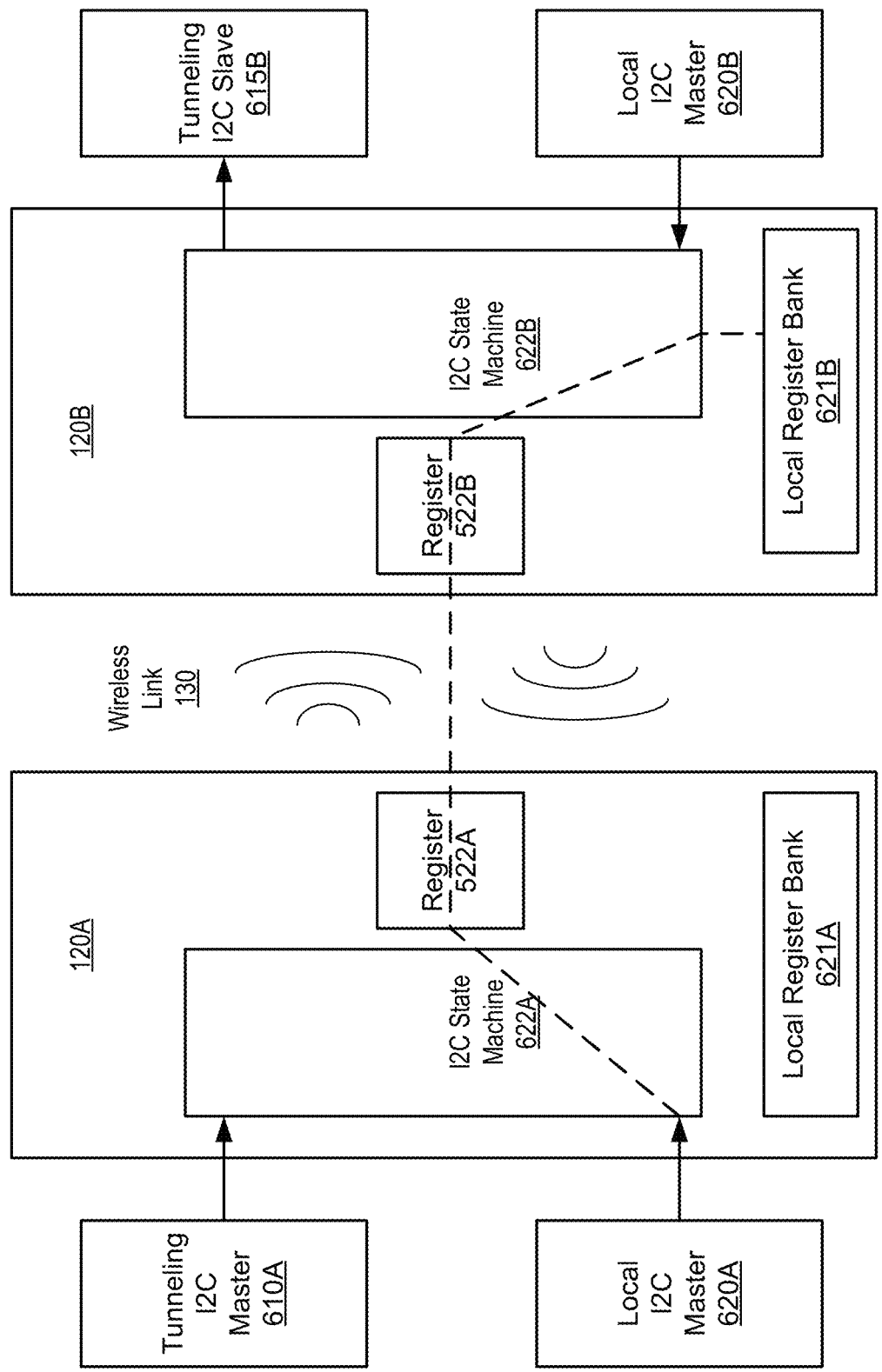
FIG. 6C illustrates a local processing apparatus accessing the register bank of the remote wireless tunneling apparatus and tunneling I2C communication between a processing apparatus and the remote wireless tunneling apparatus, according to one embodiment.

FIG. 6C illustrates I2C access of register bank 621B inside the remote wireless tunneling apparatus through the wireless link 130. To simplify the example, the remote access is illustrated in one direction only, that is, between local I2C master 620A and the register bank 621B. The same function can be performed between the local I2C master 620B and the local register bank 621A, and also be performed simultaneously during the I2C tunneling between the local I2C master 620A and the local register bank 621B. In FIG. 6C, the local I2C master 620A of processing apparatus 110A makes read/write accesses to the register bank 621B inside the remote wireless tunneling apparatus 120B. The I2C dataflow is enabled through the local I2C master 620A, I2C state machine 622A, register 522A, wireless link 130, register 522B, I2C state machine 622B, and the register bank 621B. In one embodiment, the implementation of both I2C tunneling (illustrated in FIG. 6A) and remote I2C register access (illustrated in FIG. 6C) is unified within the I2C state machine 622, that is, the mechanisms of what is written into register 522 and sent over the wireless link, and the mechanisms of how to process the contents of register 522 on the receive side is identical. Within the wireless frame-structure, shown in FIG. 7 and described below, both these functions use 2-bits each out of bits allocated for I2C.

Figure 6D:
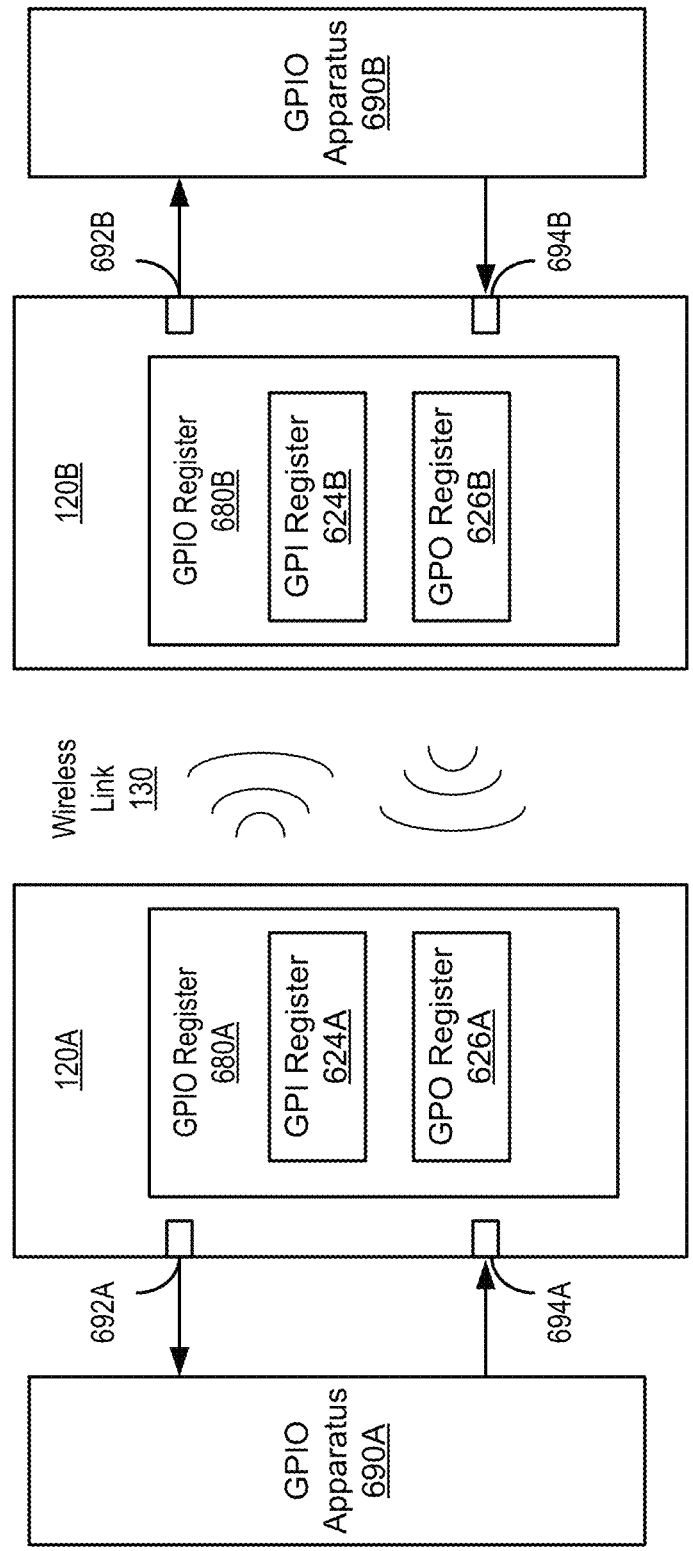
FIG. 6D illustrates two wireless tunneling apparatuses tunneling communication compliant with a general purpose input output (GPIO) protocol, according to one embodiment.

FIG. 6D illustrates two wireless tunneling apparatuses 120 tunneling communication compliant with a general purpose input output (GPIO) protocol, according to one embodiment. In FIG. 6D, the GPIO apparatus 690A can be part of the local processing apparatus 110A, and the GPIO apparatus 690B can be part of the remote processing apparatus 110B. The wireless tunneling apparatuses 120A and 120B tunnel communications compliant with GPIO protocol through the wireless link 130, where GPIO signals are tunneled unidirectionally through the pins 692A, 694A of the wireless tunneling apparatus 120A and the pins 692B, 694B of the wireless tunneling apparatus 120B. For example, the GPIO apparatus 690A provides GPI signal to the wireless tunneling apparatus 120A through the pin 694A, and the GPIO apparatus 690B receives GPO signal corresponding to the GPI pin 694A from the wireless tunneling apparatus 120B through the pin 692B.

The wireless tunneling apparatuses 120 tunnels GPIO communication according to the states of the GPIO register 680A of the wireless tunneling apparatus 120A and the GPIO register 680B of the wireless tunneling apparatus 120B. Each of the GPIO register 680 comprises a GPI register 624 and a GPO register 626. In one embodiment, the GPIO register 680 is part of the register 522 of FIG. 5. The content stored in a GPI register 624 of one wireless tunneling apparatus 120 is transmitted to a corresponding GPO register of another wireless tunneling apparatus 120. In one aspect, the GPI register 624 at one wireless tunneling apparatus 120 is replayed by the GPO register 626 at another wireless tunneling apparatus 120 based on its own local clock. The jitter arising due to difference between the two "local clocks" at two different wireless tunneling apparatuses 120 is low enough, and within tolerance of most use cases of GPIO protocol. Hence, the GPI register 624A at one wireless tunneling apparatus 120A can be faithfully replayed at a roughly constant delay by the GPO register 626B of the other wireless tunneling apparatus 120B. Thus, this embodiment enables GPIO data to be communicated from a local processing apparatus to a remote processing apparatus (or vice versa) as if the apparatuses were directly connected via a wired GPIO link.

In alternate embodiments the GPIO apparatus could be mixed and matched with a 2-pin I2C interface. For example, the local I2C master 620A of FIG. 6B could be used to write into GPI register 624A, instead of using the pin 694A of GPIO apparatus 690A. This goes over wireless link 130 to change the content of the GPO register 626B, and thereby affecting the pin 692B connected to the GPIO apparatus 690B. Likewise, GPIO tunneling data via pin 694A, GPI register 624A, wireless link 130, and ending up in GPO register 626B could be read using a local I2C master 620B.

FIG. 7 illustrates an example frame structure 700 for wireless communication to tunnel communication for two or more wired communication protocols simultaneously, according to one embodiment. In one embodiment, the same frame-structure 700 is used in both directions of the wireless link 130. The frame-structures 700 includes multiple time slots (which may each comprise one or more symbols) including slots 710A . . . 710F (generally herein referred to as "a slot 710") for USB 3.0, slots 720A . . . 720E (generally herein referred to as "a slot 720") for USB 2.0, slots 750A, 750B (generally herein referred to as "a slot 750") for I2C, a slot 760 for wireless link management (WLM), a slot 770 for GPIO, and slots 780A, 780B (generally herein referred to as "a slot 780") for a parity check. In one example shown in FIG. 7, the first transmit communication signal 505 is assigned to a first portion comprising slots 710A . . . 710F and 720A . . . 720E, where the second transmit communication signal 523 is assigned to a second portion comprising the slots 750A, 750B, and 770. Slots within the frame-structure 700 are allocated to satisfy wireless bandwidth requirement for each stream, while minimizing worst inter-slot latency for a stream.

In one implementation, the frame structure 700 starts with a fixed byte used to determine the start of a 472-bit frame, shown as SYNC 705 in FIG. 7. Accordingly, the SYNC 705 indicates a start of the frame 700. Other slots are assigned for data from the following data streams:

1. USB3—USB3.0 super-speed assigned to the slot 710
2. USB2—USB2.0 high-/full-/low-speed assigned to the slot 720
3. I2C—I2C tunneling assigned to the slot 750
4. WLM—Wireless Link Management assigned to the slot 760
5. GPIO—GPIO tunneling assigned to the slot 770.

In an embodiment, each of the USB2.0 or USB3.0 slot comprises a 9-bit symbol. The $9^{th}$ bit may be implemented to conform to the USB3.0 standard, and it denotes if a byte is a data-byte or a K-code (control byte). For the USB2.0 protocol the $9^{th}$ bit is unused. However, the combiner 512 employs a special but fixed K-code to denote "Wireless Filler" and which is used for both USB3.0 and USB2.0 streams. This special code is chosen to distinguish it from the standard K-codes used within USB3.0 streams. Whenever there is no payload available for either USB3.0 or USB2.0 streams the combiner 512 inserts "Wireless Filler". Sequence of K-code symbols are also employed for encoding signaling information generated by the super-speed state-machine and the USB2.0 state-machine.

In one implementation, 2 bits out of every group of 8 bits of I2C slot 750 are used for I2C tunneling communication of the type shown in FIG. 6A. Another 2 bits out of every group of 8 bits of I2C slot 750 are used for remote register access, as shown in FIG. 6C.

In one embodiment, the slot 770 is used to communicate GPIO data, such that the value of GPI pin is transmitted over the wireless link 130 once every 472-bit frame 700.

The WLM byte is allocated at the slot 760 for exchanging low data rate information between two wireless processing apparatuses 110. For example, wireless states (e.g., power states) between two wireless processing apparatuses 110 can be exchanged through the WLM byte. The WLM byte contains data that is either static (e.g., apparatus type indication) or data that is changing slowly (e.g., slow changing states). In one embodiment, the WLM includes 64-bit data or eight different 8-byte registers. In one implementation, a wireless frame-structure picks up each of these registers with a fixed periodicity of once every 8 frames. In one embodiment, the WLM byte contains 3-bit address and 5-bit of useful data, where the 3-bit address is provisioned to allow a receiver to decode which one of the 8 registers is received as a WLM byte.

The frame-structure 700 also contains parity bits (16-bit parity) at two slots 780A and 780B. These are employed for correcting errors that are introduced during wireless transmission. The first 16-bit parity is allocated at the slot 780A, and covers parity for a first set of slots 740A including the slots 750A, 770, 710A, 720A, 710B, 720B, 710C, and 720C, appearing before the slot 780A. The SYNC byte is left out of parity calculation. Likewise, the second 16-bit parity at slot 780B covers parity of a second set of slots 740B including the slots 750B, 710D, 760, 710E, 720D, 710F, and 720E, appearing after the slot 780A and before the slot 780B.

The frame-structure 700 for high-frequency wireless link is designed such that it occupies the entire wireless bandwidth and without gaps. This is carried right through the implementation flow in selecting interface widths between different digital blocks in transmit and receive pipelines. That is, in one embodiment, none of the interfaces are wider than they need to be. This implementation approach is suited for low power. For example, one implementation supports frame-structures, clock-frequencies, and interfaces to transmit and receive data at the constant and sustained rate 6 Gbps. For digital design, one embodiment uses 187.5 MHz and 32-bit interface, which happens to exactly have bandwidth of 6 Gbps.

Figure 8A:
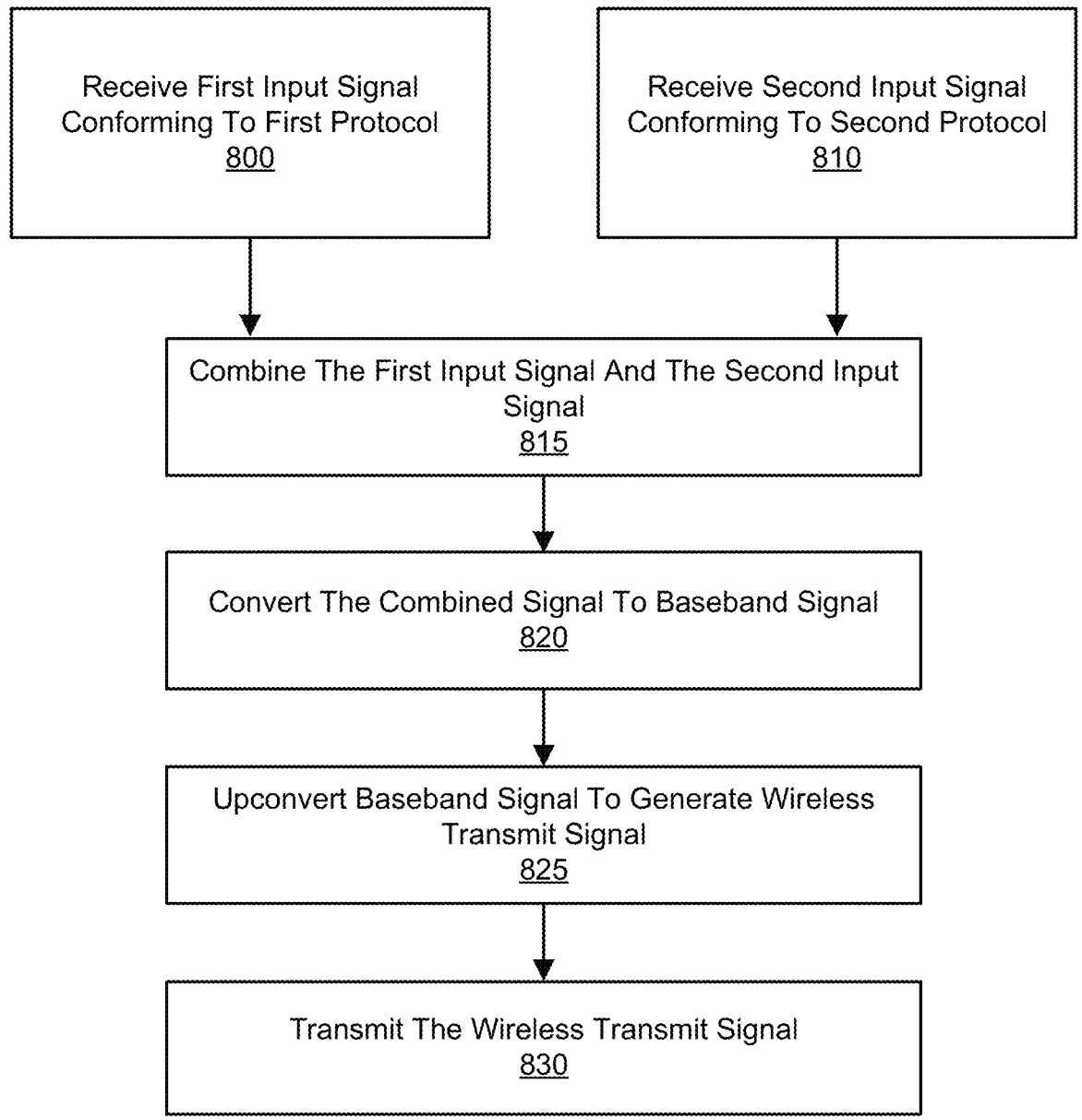
FIG. 8A illustrates an example process of transmitting two different communication protocols through a single wireless link, according to one embodiment.

FIG. 8A illustrates an example process of transmitting two different wired communication protocols through a single wireless link, according to one embodiment. The steps in FIG. 8A are performed by a local wireless tunneling apparatus 120A. Alternatively, the steps in FIG. 8A can be performed by a remote wireless tunneling apparatus 120B or other apparatuses.

The wireless tunneling apparatus 120 receives 800 a first input signal conforming to a first wired communication protocol. In addition, the wireless tunneling apparatus 120 receives 810 a second input signal conforming to a second wired communication protocol. The wireless tunneling apparatus 120 combines 815 the first input signal and the second input signal into a combined signal. The wireless tunneling apparatus 120 converts 820 the combined signal into a baseband transmit signal that comprises a first portion corresponding to the first input signal and a second portion corresponding to the second input signal. The wireless tunneling apparatus 120 upconverts 825 the baseband transmit signal to generate a wireless transmit signal, and transmits 830 the wireless transmit signal.

Figure 8B:
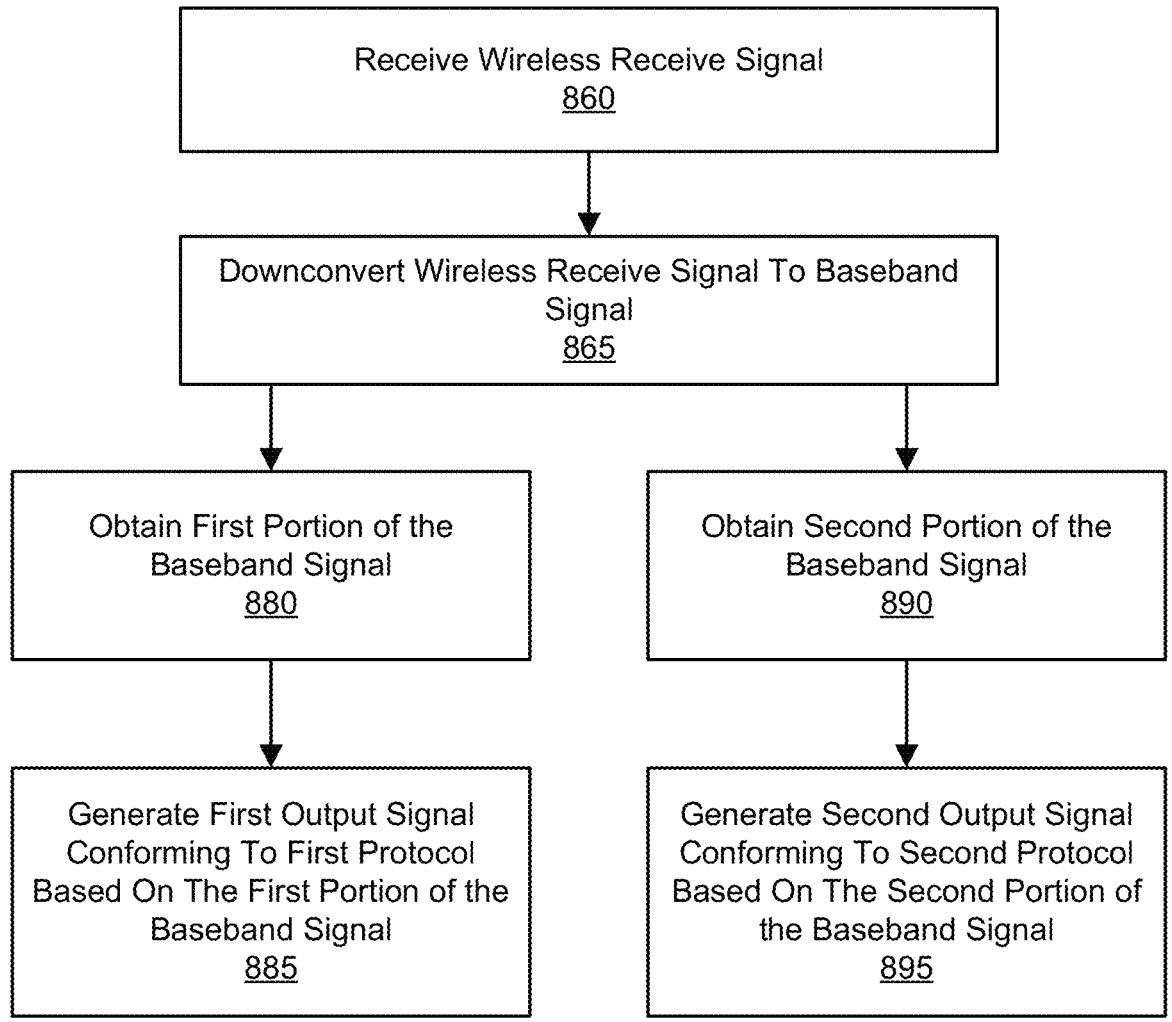
FIG. 8B illustrates an example process of receiving two different communication protocols through a single wireless link, according to one embodiment.

FIG. 8B illustrates an example process of receiving two different wired communication protocols through a single wireless link, according to one embodiment. The steps in FIG. 8B are performed by a local wireless tunneling apparatus 120A. Alternatively, the steps in FIG. 8B can be performed by a remote wireless tunneling apparatus 120B or other apparatuses.

The wireless tunneling apparatus 120 receives 860 a wireless receives signal. The wireless tunneling apparatus 120 downconverts 865 the wireless receive signal to a baseband receive signal. The wireless tunneling apparatus 120 obtains 880 a first portion of the baseband signal corresponding to a first wired communication protocol, and generates 885 a first output signal conforming to the first wired communication protocol based on the first portion of the baseband signal. Similarly, the wireless tunneling apparatus 120 obtains 890 a second portion of the baseband signal corresponding to a second wired communication protocol, and generates 895 a second output signal conforming to the second wired communication protocol based on the second portion of the baseband signal.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

What is claimed is:

1. A local wireless tunneling apparatus that operates in conjunction with a remote wireless tunneling apparatus to wirelessly tunnel communications between a remote processing apparatus and a local processing apparatus while maintaining compliance of the communications between the remote processing apparatus and the local processing apparatus with a high-speed wired communication protocol, the local wireless tunneling apparatus comprising:
a wireless transmitter configured to transmit a plurality of frames, each of the plurality of frames comprising a first receive portion encoding communications corresponding to the high-speed wired communication protocol and a second receive portion encoding communications corresponding to a low-speed wired communication protocol comprising a different protocol and communicating data at a lower speed than the high-speed wired communication protocol, the wireless transmitter configured to (i) encode a first input signal and a second input signal in a frame from the plurality of frames to generate a baseband transmit signal, the first input signal conforming to the high-speed wired communication protocol from the local processing apparatus, the second input signal conforming to the low-speed wired communication protocol from the local processing apparatus, (ii) upconvert the baseband transmit signal to generate a wireless transmit signal, and (iii) transmit the wireless transmit signal.

2. The local wireless tunneling apparatus of claim 1, wherein the baseband transmit signal comprises a first transmit portion corresponding to a first time slot of the frame and a second transmit portion corresponding to a second time slot of the frame.

3. The local wireless tunneling apparatus of claim 2, wherein the first receive portion and the first transmit portion are communicated during the first time slot of the frame, and the second receive portion and the second transmit portion are communicated during the second time slot of the frame.

4. The local wireless tunneling apparatus of claim 1, wherein a data rate of the high-speed wired communication protocol is over Gigabits per second, and a data rate of the low-speed wired communication protocol is less than Megabits per second.

5. The local wireless tunneling apparatus of claim 1, wherein the low-speed wired communication protocol is I2C (Inter Integrated Circuit) or GPIO General Purpose Input Output).

6. The local wireless tunneling apparatus of claim 1, wherein the wireless transmitter comprises:
a high-frequency (HF) transmitting circuit, the HF transmitting circuit for generating a high data rate digital baseband signal; and
a low-frequency (LF) transmitting circuit, the LF transmitting circuit for generating a low data rate signal that has a substantially lower data rate than the high data rate signal produced by the HF transmitting circuit.

7. The local wireless tunneling apparatus of claim 6, further comprising:
a state machine configured to control a power state of the wireless transmitter, wherein the state machine controls the HF transmitting circuit to operate in a low power state when the LF transmitting circuit is transmitting a low frequency signal.

8. The local wireless tunneling apparatus of claim 1, further comprising:
a wireless receiver configured to receive a wireless receive signal from the remote wireless tunneling apparatus, the wireless receive signal having the plurality of frames, the wireless receiver to decode the wireless receive signal to (i) generate a first output signal based on a predicted state of the remote processing apparatus and the first receive portion that conforms to the high-speed wired communication protocol, and (ii) generate a second output signal based on the second receive portion that conforms to the low-speed wired communication protocol;
a state machine configured to determine the predicted state of the remote processing apparatus based on the first receive portion of the wireless receive signal and to control operation of the wireless receiver based on the predicted state;
an interface circuit coupled to the local processing apparatus and configured to provide the first output signal to the local processing apparatus via the high-speed wired communication protocol; and
a register configured to store the second output signal.

9. The local wireless tunneling apparatus of claim 8, wherein the state machine is further configured to (i) predict a state of the low-speed wired communication protocol based on the second output signal and (ii) determine, based on the predicted state of the low-speed wired communication protocol, whether a wireless receiver is to decode the second receive portion of a wireless receive signal or the wireless transmitter is to encode the second input signal for transmission.

10. The local wireless tunneling apparatus of claim 8, wherein the first receive portion is generated at the remote processing apparatus at a high-speed data rate based on a remote high-speed clock signal, and wherein the first output signal is generated at the local wireless tunneling apparatus at the high-speed data rate based on a local high-speed clock signal, wherein a low-speed data input corresponding to the second receive portion is generated at a remote processing apparatus coupled to the remote wireless tunneling apparatus according at a low-speed data rate based on a remote low-speed clock, and wherein the second output signal is generated at the local wireless tunneling apparatus at the low-speed data rate based on a local low-speed clock signal, the second output signal at a substantially constant delay relative to the low-speed data input.

11. A method for wirelessly tunneling communications between a local processing apparatus and a remote processing apparatus while maintaining compliance of the communications between the local processing apparatus and the remote processing apparatus with a high-speed wired communication protocol, the method comprising:
encoding, by a wireless transmitter of a local wireless tunneling apparatus coupled to the local processing apparatus, a first input signal and a second input signal in a frame from a plurality of frames to generate a baseband transmit signal, the first input signal conforming to the high-speed wired communication protocol from the local processing apparatus, the second input signal conforming to a low-speed wired communication protocol from the local processing apparatus;
upconverting, by the wireless transmitter, the baseband transmit signal to generate a wireless transmit signal; and
transmitting the wireless transmit signal.

12. The method of claim 11, wherein the baseband transmit signal comprises a first transmit portion corresponding to a first time slot of the frame and a second transmit portion corresponding to a second time slot of the frame.

13. The method of claim 12, further comprising:
transmit a plurality of frames, each of the plurality of frames comprising a first receive portion encoding communications corresponding to the high-speed wired communication protocol and a second receive portion encoding communications corresponding to a low-speed wired communication protocol comprising a different protocol and communicating data at a lower speed than the high-speed wired communication protocol.

14. The method of claim 13, wherein the first receive portion and the first transmit portion are communicated during the first time slot of the frame, and the second receive portion and the second transmit portion are communicated during the second time slot of the frame.

15. The method of claim 11, wherein a data rate of the high-speed wired communication protocol is over Gigabits per second, and a data rate of the low-speed wired communication protocol is less than Megabits per second.

16. The method of claim 11, wherein the low-speed wired communication protocol is I2C or GPIO.

17. The method of claim 11, further comprising:
generating a high data rate digital baseband signal; and
generating a low data rate signal that has a substantially lower data rate than the high data rate signal produced by the HF transmitting circuit.

18. The method of claim 11, further comprising:
generating a first output signal based on a predicted state of the remote processing apparatus and the first receive portion that conforms to the high-speed wired communication protocol;
generating a second output signal based on the second receive portion that conforms to the low-speed wired communication protocol;
determining the predicted state of the remote processing apparatus based on the first receive portion of the wireless receive signal and to control operation of the wireless receiver based on the predicted state; and
providing the first output signal to the local processing apparatus via the high-speed wired communication protocol.

19. The method of claim 18, further comprising:
predicting a state of the low-speed wired communication protocol based on the second output signal; and
determining, based on the predicted state of the low-speed wired communication protocol, whether a wireless receiver is to decode the second receive portion of a wireless receive signal or the wireless transmitter is to encode the second input signal for transmission.

20. The method of claim 18, wherein the first receive portion is generated at the remote processing apparatus at a high-speed data rate based on a remote high-speed clock signal, and wherein the first output signal is generated at the local wireless tunneling apparatus at the high-speed data rate based on a local high-speed clock signal, wherein a low-speed data input corresponding to the second receive portion is generated at a remote
processing apparatus coupled to the remote wireless tunneling apparatus according at a low-speed data rate based on a remote low-speed clock, and wherein the second output signal is generated at the local wireless tunneling apparatus at the low-speed data rate based on a local low-speed clock signal, the second output signal at a substantially constant delay relative to the low-speed data input.

* * * * *